(12) United States Patent
Tofighbakhsh

(10) Patent No.: US 9,667,629 B2
(45) Date of Patent: *May 30, 2017

(54) OPEN CONNECTION MANAGER VIRTUALIZATION AT SYSTEM-ON-CHIP

(71) Applicant: AT&T Intellectual Property I, L.P., Atlanta, GA (US)

(72) Inventor: Mostafa Tofighbakhsh, Cupertino, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/996,082

(22) Filed: Jan. 14, 2016

(65) Prior Publication Data

US 2016/0134630 A1 May 12, 2016

Related U.S. Application Data

(63) Continuation of application No. 14/077,981, filed on Nov. 12, 2013, now Pat. No. 9,270,659.

(51) Int. Cl.
*G06F 21/76* (2013.01)
*H04L 29/06* (2006.01)
(Continued)

(52) U.S. Cl.
CPC .......... *H04L 63/0876* (2013.01); *G06F 21/57* (2013.01); *G06F 21/604* (2013.01);
(Continued)

(58) Field of Classification Search
CPC .................................................. G06F 15/7807
See application file for complete search history.

(56) References Cited

U.S. PATENT DOCUMENTS

| 7,013,398 B2 | 3/2006 | Zhao |
| 7,353,362 B2 | 4/2008 | Georgiou et al. |

(Continued)

FOREIGN PATENT DOCUMENTS

| CA | 2547468 | 5/2005 |
| CN | 102595650 | 7/2012 |

(Continued)

OTHER PUBLICATIONS

Kellerer et al., "Cross-Layer Adaptation for Optimized B3G Service Provisioning," Proc. 6th International Symposium, 2003, 5 pages.

(Continued)

*Primary Examiner* — Josnel Jeudy
(74) *Attorney, Agent, or Firm* — Amin, Turocy & Watson, LLP

(57) ABSTRACT

Resource and memory use by applications used by user equipment (UE) can be adaptively controlled. A UE comprises a connection-manager kernel (CMKC) that can be embedded at the SOC level to facilitate resource and memory control at SOC level. CMKC operates in conjunction with an operating system kernel. CMKC comprises functional blocks that provide network enabler functions and observability APIs for network enhancement, traffic flow monitoring and filtering, QOE executive routines, and traffic flow time shifting. CMKC performs or provides analytics, security and firewall tags, cache management at SOC level, and policy enforcement. CMKC and a trusted memory operate in a trusted zone environment to facilitate secure operation. CMKC adaptively collects information from control registers and analytics, and maps such information to the trusted memory, which can be accessible to trusted APIs to facilitate enabling trusted applications to have knowledge of contextual network information.

20 Claims, 15 Drawing Sheets

(51) Int. Cl.
*H04W 12/06* (2009.01)
*G06F 21/57* (2013.01)
*G06F 21/60* (2013.01)
*H04L 12/933* (2013.01)
*H04L 29/08* (2006.01)

(52) U.S. Cl.
CPC ............ *G06F 21/76* (2013.01); *H04L 49/109* (2013.01); *H04L 63/08* (2013.01); *H04L 63/0823* (2013.01); *H04L 63/102* (2013.01); *H04L 69/30* (2013.01); *H04L 69/321* (2013.01); *H04W 12/06* (2013.01)

(56) References Cited

U.S. PATENT DOCUMENTS

| | | | |
|---|---|---|---|
| 7,475,182 B2 | 1/2009 | Matsuse et al. | |
| 7,539,175 B2 | 5/2009 | White et al. | |
| 7,733,125 B2 | 6/2010 | Murotake | |
| 7,818,163 B2 | 10/2010 | Lertora et al. | |
| 7,836,444 B2 | 11/2010 | Kim | |
| 7,940,778 B2 | 5/2011 | Ding et al. | |
| 7,975,036 B2 | 7/2011 | Shyy et al. | |
| 8,020,163 B2 | 9/2011 | Nollet et al. | |
| 8,107,457 B2 | 1/2012 | White et al. | |
| 8,189,612 B2 | 5/2012 | Lemaire et al. | |
| 8,443,074 B2 | 5/2013 | Bahl et al. | |
| 8,863,252 B1* | 10/2014 | Katzer .................... | G06F 21/53 705/71 |
| 2003/0084229 A1 | 5/2003 | Ho et al. | |
| 2004/0184470 A1 | 9/2004 | Holden | |
| 2006/0015576 A1* | 1/2006 | Seo ......................... | H04L 12/14 709/219 |
| 2006/0041889 A1 | 2/2006 | Radulescu et al. | |
| 2007/0261124 A1* | 11/2007 | Centonze ............ | G06F 21/6227 726/27 |
| 2008/0320499 A1 | 12/2008 | Suit | |
| 2010/0061299 A1 | 3/2010 | Kennedy et al. | |
| 2010/0165856 A1 | 7/2010 | Melpignano et al. | |
| 2010/0199008 A1 | 8/2010 | Lee et al. | |
| 2011/0125905 A1 | 5/2011 | Baucke et al. | |
| 2011/0216753 A1 | 9/2011 | Kneckt et al. | |
| 2012/0036581 A1 | 2/2012 | Maximilien | |
| 2012/0054771 A1 | 3/2012 | Krishnamurthy | |
| 2012/0221884 A1 | 8/2012 | Carter et al. | |
| 2012/0246370 A1 | 9/2012 | Zhang | |
| 2012/0246641 A1 | 9/2012 | Gehrmann | |
| 2012/0281716 A1 | 11/2012 | Vijayasankar et al. | |
| 2012/0294152 A1 | 11/2012 | Yousefi'zadeh et al. | |
| 2013/0111211 A1 | 5/2013 | Winslow et al. | |
| 2013/0182601 A1 | 7/2013 | Bandyopadhyay et al. | |
| 2013/0235721 A1* | 9/2013 | Nguyen ................ | H04L 1/1825 370/230 |
| 2013/0282951 A1* | 10/2013 | Kuo ..................... | G06F 21/575 711/102 |

FOREIGN PATENT DOCUMENTS

| | | |
|---|---|---|
| DE | 102007037064 A1 | 1/2009 |
| EP | 2015174 A1 | 1/2009 |
| EP | 2530989 | 5/2012 |
| KR | 20060011560 | 2/2006 |
| KR | 100862918 | 6/2008 |
| KR | 20090011845 A | 2/2009 |
| WO | 03028228 | 4/2003 |
| WO | 2012074360 | 6/2012 |

OTHER PUBLICATIONS

Kim et al., "Cross-Layer Design for Dynamic Resource Allocation in Wireless Networks," The MITRE Corporation, Aug. 2004, 9 pages.

Botek et al., "Summary of selected Cross-Layer Design Techniques proposed for wireless 3G and beyond networks (May 2010)," School of Electrical & Information Engineering, University of Sydney, Australia, 3 pages.

Gelenbe et al., "Self-aware networks and QoS," Proceedings of the IEEE, vol. 92, No. 9, Sep. 2004, 1478-1489.

Wu et al., "A Dynamic Call Admission Policy With Precision QoS Guarantee Using Stochastic Control for Mobile Wireless Networks," Proceedings of the IEEE, vol. 92, No. 9, Sep. 2004, 257-271.

Naguleswaran et al., "Cross-Layer Planning and Optimization for Military Applications," MilCIS2009, Canberra, Nov. 10-12, 2009, 1-5.

Office Action dated Oct. 19, 2015 for U.S. Appl. No. 14/077,925, 28 pages.

Office Action dated Dec. 18, 2014 for U.S. Appl. No. 14/077,981, 31 pages.

Office Action dated May 22, 2015 for U.S. Appl. No. 14/077,981, 25 pages.

* cited by examiner

OPEN CONNECTION MANAGER VIRTUALIZATION AT SYSTEM-ON-CHIP

CROSS-REFERENCE TO RELATED APPLICATION

This application is a continuation of, and claims priority to, U.S. patent application Ser. No. 14/077,981, (now U.S. Pat No. 9,270,659), filed Nov. 12, 2013, and entitled "OPEN CONNECTION MANAGER VIRTUALIZATION AT SYSTEM-ON-CHIP," the entirety of which is hereby incorporated herein by reference.

TECHNICAL FIELD

This disclosure relates generally to network communications, e.g., to an open connection management virtualization at system-on-chip.

BACKGROUND

A wireless communication system can be utilized to provide wireless access to various communication services (e.g., voice, video, data, messaging, content broadcast, etc.) for users of the system. Wireless communication systems can operate according to a variety of network specifications and/or standards, such as, for example, universal mobile telecommunications system (UMTS), third generation partnership project (3GPP) long term evolution (LTE), high speed packet access (HSPA). These specifications and/or standards use different modulation techniques, such as code division multiple access (CDMA), time division multiple access (TDMA), frequency division multiple access (FDMA), multi-carrier CDMA (MC-CDMA), single-carrier CDMA (SC-CDMA), orthogonal frequency division multiple access (OFDMA), single-carrier frequency division multiple access (SC-FDMA), and so on.

Communication devices (e.g., wireless communication devices), such as mobile phones, electronic tablets, electronic gaming devices, and computers, are increasingly using applications to perform various functions and to communicate information between these communication devices and other communication devices (e.g., other mobile phones, electronic tablets, electronic gaming devices, computers, servers, etc.). An application can reside on a user's communication device, in a cloud, and/or on a server farm, for example.

The above-described description is merely intended to provide a contextual overview of wireless communication networks, and is not intended to be exhaustive.

DETAILED DESCRIPTION

Figure 1:
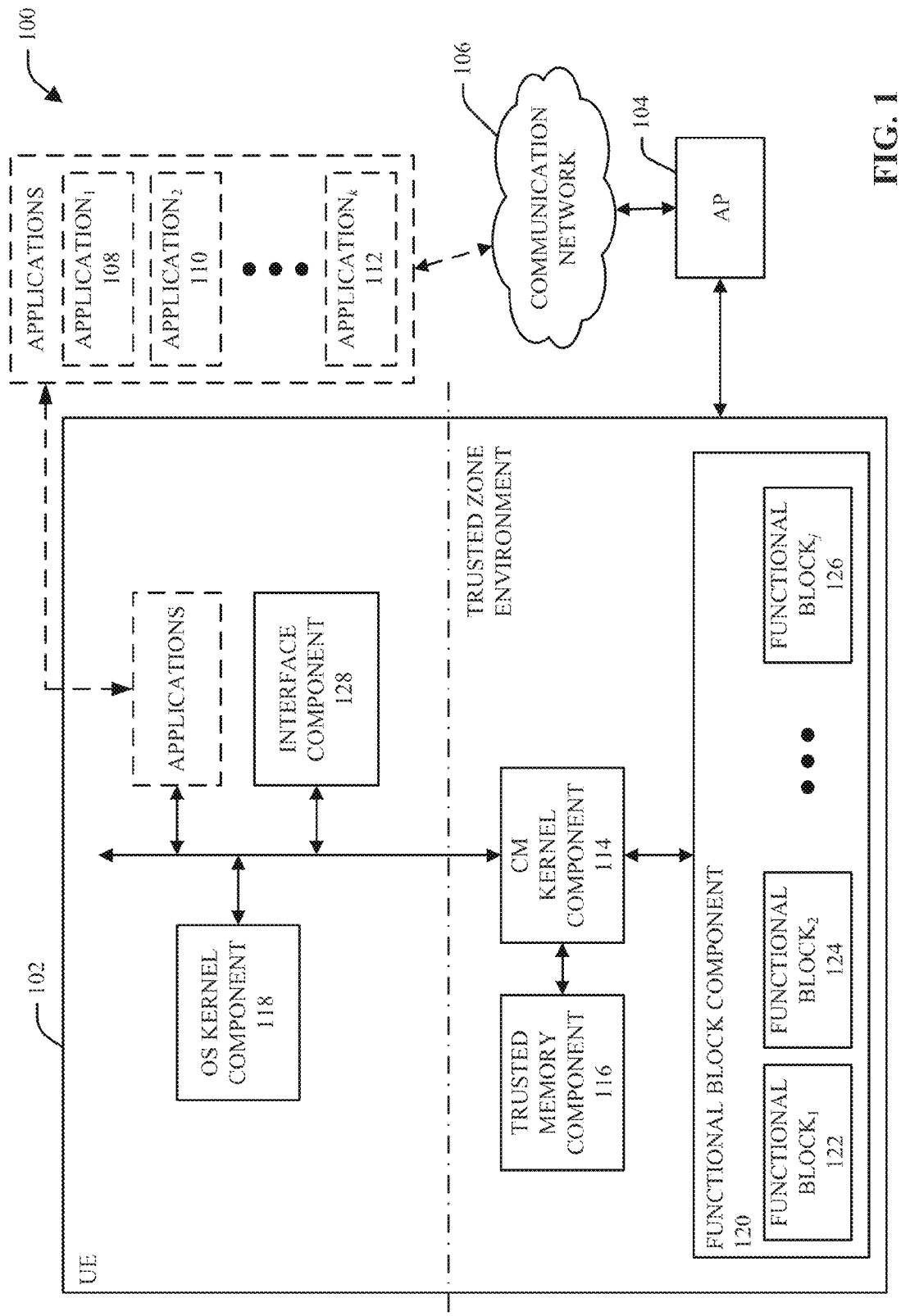
FIG. 1 illustrates a block diagram of an example system that can facilitate adaptively controlling a trusted memory and resources (e.g., functional blocks) used in connection with applications employed by communication devices in a communication network, in accordance with various aspects and embodiments described herein.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Communication devices (e.g., wireless communication devices), such as mobile phones, electronic tablets, electronic gaming devices, and computers, can be used to communicate voice and data information to other communication devices and/or to perform other desired functions (e.g., perform calculations, take photographs, play video or music content, play games, etc.). Communication devices also are increasingly using applications to perform various functions and to communicate information between these communication devices and other communication devices.

With respect to communication devices, there exists a number of different communication device manufacturers, different types of operating systems, and different types of communication platforms. With regard to operating an application in a communication network, these different communication device manufacturers, different types of operating systems, and different types of communication platforms can impact the communication network in different ways, which can thereby result in an undesirable fragmentation issue in the communication network. Such fragmentation can cause an inefficient use of resources by the communication network, an inefficient use of resources by communication devices, and a lower quality of experience for communication device users.

Techniques for controlling (e.g., adaptively controlling) access to a trusted memory and resources (e.g., functional blocks and other modem functions) that can be employed by applications used by user equipment (UE) are presented herein. A UE (e.g., communication device) can comprise a connection-manager (CM) kernel component (e.g., an open source CM kernel component) that can be embedded at the system-on-chip (SOC) level to facilitate resource control at the SOC level. The CM kernel component can facilitate providing connection manager acceleration at the hardware level (e.g., SOC level) embedded into the chip sets. Various modem interfaces can be provided to the CM kernel component, for example, running northbound as a micro kernel.

The CM kernel component can operate in conjunction with an operating system (OS) kernel component, wherein the CM kernel component can facilitate controlling all or a portion of embedded resources (e.g., embedded functional blocks and/or other modem functions) and the OS kernel component can facilitate controlling a certain portion of the resources (e.g., a portion of the functional blocks or modem functions). The CM kernel component can comprise or be associated with (e.g., communicatively connected to) functional blocks (e.g., embedded functional blocks) that can provide access control tools (e.g., intelligent access control tools), network enabler functions and observability APIs for network enhancement (e.g., network optimization), traffic flow monitoring and filtering, quality of experience (QOE) executive routines, and traffic flow time shifting. The CM kernel component also can perform or provide analytics (e.g., using analytics engines), cross-layer observability, security and firewall tags (e.g., security and firewall functionality embedded at the chip, SOC fabric, or interconnects), cache management at SOC level, and policy enforcement (e.g., in accordance with defined communication enhancement criteria).

The CM kernel component and a trusted memory component can operate in a trusted execution environment to facilitate secure performance of operations within the trusted execution environment. The CM kernel component can adaptively collect information from control registers and analytics associated with the communication network, and can map such information to, and/or store such information in, the trusted memory component. The memory map associated with the trusted memory component can be well defined and standardized with regard to format, scalability, and security. The disclosed subject matter can facilitate enabling components, applications, and other features to be developed around the CM kernel component and trusted memory component.

The CM kernel component can control access to the trusted memory component, wherein the CM kernel component can enable the trusted memory component to be accessible to trusted APIs and trusted applications (e.g., trusted and/or certified applications) to facilitate enabling trusted applications associated with the UE to have knowledge of contextual network-related information. For instance, the CM kernel component can facilitate providing an environment, wherein trusted applications can use (e.g., directly use) the hardware services (e.g., services associated with the embedded functional blocks) without having to use the OS kernel component (e.g., rich OS kernel). The disclosed subject matter can facilitate enabling applications to be network aware and to operate more efficiently and in accordance with defined communication enhancement criteria (e.g., based on communication-network optimization or enhancement practices).

Referring now to the drawings, FIG. 1 illustrates a block diagram of an example system 100 that can facilitate adaptively controlling a trusted memory and resources (e.g., functional blocks) used in connection with applications employed by communication devices (e.g., UEs) in a communication network, in accordance with various aspects and embodiments described herein. The system 100 can comprise a UE 102 (e.g., mobile and/or wireless communication device, such as a mobile phone (e.g., 3GPP universal mobile telecommunications system (UMTS) phone), electronic notebook, electronic pad or tablet, electronic gaming device, personal digital assistant (PDA), computer, set-top box, etc.) that can operate and communicate in a communication network environment. In an aspect, the UE 102 can be communicatively connected via a wireless communication connection(s) via an access point (AP) 104 to a communication network(s) 106.

In an aspect, as the UE 102 is moved through a wireless communication network environment, at various times, the UE 102 can be connected (e.g., wirelessly connected) to one of a plurality of APs (e.g., macro or cellular AP, femto AP, pico AP, wi-fi AP, wi-max AP, hotspot (e.g., hotspot 1.x, hotspot 2.x, where x is an integer number; UE 102 functioning as a mobile hotspot; etc.), etc.), such as an AP 104, that can operate in the wireless communication network environment. An AP (e.g., 104) can serve a specified coverage area to facilitate communication by the UE 102 or other UEs in the wireless communication network environment. The AP 104 can serve a respective coverage cell (e.g., macrocell, femtocell, picocell, etc.) that can cover a respective specified area, and the AP 104 can service mobile wireless devices, such as UE 102, located in the respective area covered by the respective cell, where such coverage can be achieved via a wireless link (e.g., uplink (UL), downlink (DL)). When an attachment attempt is successful, the UE 102 can be served by the AP 104 and incoming voice and data traffic can be paged and routed to the UE 102 through the AP 104, and outgoing voice and data traffic from the UE 102 can be paged and routed through the AP 104 to other communication devices (e.g., another UE) in the communication network environment. In an aspect, the UE 102 can be connected and can communicate wirelessly using virtually any desired wireless technology, including, for example, cellular, wi-fi, wi-max, wireless local area networks (WLAN), etc.

At desired times, the UE 102 can utilize one or more applications, such as, for example, application$_1$ 108, application$_2$ 110, and/or (up through) application$_k$ 112, wherein k can be virtually any desired number. In accordance with various implementations, all or a portion of the applications (e.g., 108, 110, 112, etc.) can reside in the UE 102 and/or all or a portion of the applications (e.g., 108, 110, 112, etc.) can reside in another communication device(s) associated with the communication network 106. In some implementations, the communication network 106 can facilitate wireless connection with the UE 102 connected to the AP 104 and facilitate communication by or between a UE 102 and another UE(s) (not shown) or other type of communication device(s) (e.g., computer, server or server farm that can include an application server or content server that can be provide video content, audio content, and/or other content comprising other types of information, etc.) (not shown), wherein the communication device(s) can be associated with (e.g., communicatively connected to) the communication network 106 in the communication network environment.

In accordance with various implementations, all or a portion of the applications (e.g., 108, 110, 112, etc.) can reside in the UE 102 and/or all or a portion of the applications (e.g., 108, 110, 112, etc.) can reside in a remote communication device(s) associated with the communication network 106. An application (e.g., 108, 110, or 112) being used by the UE 102 can have functions that can be executed by the UE 102 and/or by the remote communication device associated with the application. An application (e.g., 108, 110, 112, etc.) can be, for example, a messaging application, a gaming application, a utility application, a financial application, a news application, a social networking application, a video application, an image capture application (e.g., a video capture or photograph capture application), a music application, an online shopping application, a location-detection application, a geographical-map-generation application, a cryptographic application (e.g., for encryption or decryption), a digital rights management (DRM) application, a mobile-to-mobile (M2M) type of application, a VoIP type of application, or a near real time (NRT) type of application, among other types of applications. In some implementations, the UE 102 can be connected (e.g., directly) with one or more applications (e.g., 108, 110, or 112) using, for example, one or more various types of wireless communication technology, such as near field communication (NFC) technology, bluetooth technology, zigbee technology, etc. In certain implementations, the UE 102 can function as a mobile hotspot (e.g., AP) to which one or more applications can be wirelessly connected to facilitate communication of traffic (e.g., voice or data traffic) between an application(s) and the communication network 106 via the UE 102. It is to be further appreciated and understood that one or more communication devices (e.g., remote communication device) can be located within a cloud, wherein, for example, the cloud can include a server farm comprising one or more servers (e.g., application servers) that can be utilized to perform respective application functions (e.g., VoIP, video streaming, messaging, multimedia, electronic gaming, news-related functions, social media functions, finance-related functions, etc.) based at least in part on the type of application.

The communication network 106 can include one or more wireline communication networks and one or more wireless communication networks, wherein the one or more wireless communication networks can be based on one or more various types of communication technology or protocols, such as, for example, 3G, 4G, or x generation (xG) network, where x can be virtually any desired integer or real value; wi-fi; etc. The communication network 106 (e.g., a core network, or a network comprising a core network and/or an IP-based network) can facilitate routing voice and data communications between a communication device(s) (e.g., UE 102) and other communication devices (e.g., remote communication device) associated with the communication network 106 in the communication network environment. The communication network 106 also can allocate resources to the UE 102 or other UEs in the communication network 106, convert or enforce protocols, establish and enforce quality of service (QOS) for the UEs (e.g., UE 102), provide applications or services in the communication network 106, translate signals, and/or perform other desired functions to facilitate system interoperability and communication in the communication network 106 (e.g., wireless portion of the communication network 106 or wireline portion of the communication network 106). The communication network 106 further can include desired components, such as routers, nodes, switches, interfaces, controllers, etc., that can facilitate communication of data between communication devices in the communication network environment.

The UE 102 can comprise a CM kernel component 114 that can facilitate establishing connections between the UE 102 (and applications used by the UE 102) and the communication network 106 and/or another communication device associated with the communication network 106, controlling data stored in a trusted memory component 116 that can be associated with (e.g., communicatively connected to) the CM kernel component 114, controlling operation of a cache memory component associated with the CM kernel component 114, controlling operation of the applications (e.g., 108, 110, 112, etc.), controlling operation of functional blocks (e.g., functional blocks comprising baseband functions), and/or performing other operations that can facilitate desired operation of the UE 102, as more fully disclosed herein.

The CM kernel component 114 also can facilitate performing kernel functions in connection with the UE 102. For instance, the CM kernel component 114 can comprise a dedicated kernel that can facilitate performing certain operations comprising, for example, managing certain input/output data requests (e.g., from software and/or an application), translating certain requests into instructions (e.g., data processing instructions) for execution by a processor component or other component (e.g., a functional block(s)) of the UE 102, etc.

In some implementations, the CM kernel component 114 can facilitate performing resource manager-related functions for the UE 102. For instance, the CM kernel component 114 can facilitate managing certain resources (e.g., functional blocks comprising baseband functions, modem blocks comprising modem functions, etc.) contained on the UE 102 and/or performing other desired operations in connection with such resources of the UE 102.

The UE 102 also can comprise an operating-system (OS) kernel component 118 (e.g., rich OS kernel) that can be employed to facilitate performing operations by the UE 102, including, for example, managing input/output data requests (e.g., from software and/or an application), translating requests into instructions (e.g., data processing instructions) for execution by a processor component or other component of the UE 102, etc. The OS kernel component 118 can be associated with (e.g., communicatively connected to) the CM kernel component 114 (e.g., via a bus).

The UE 102 also can comprise a functional block component 120 that can comprise a set of functional blocks (e.g., functional block sub-components comprising respective baseband functions), comprising functional block$_1$ 122, functional block₂ 124, and/or (up through) functional blockⱼ 126, wherein j can be virtually any desired number. The respective functional blocks (e.g., 122, 124, 126, etc.) can perform respective functions (e.g., baseband functions), such as, for example, data compression or decompression, data encryption or decryption, location detection, network-awareness functions (e.g., network-condition sensing (e.g., network-congestion sensing), power level sensing, and/or other functions, such as disclosed herein), etc. The set of functional blocks (e.g., 122, 124, 126, etc.) can be located on or embedded in the SOC (e.g., can be at the SOC level on the SOC chip set), wherein the functional blocks can be or can comprise firmware or hardware, for example. The CM kernel component 114 can be embedded in the SOC (e.g., can be at the SOC level on the SOC chip set) and/or can have access to at least some of the control layers at the SOC, and can facilitate controlling operation of the functional blocks (e.g., 122, 124, 126, etc.) in the set of functional blocks.

In some implementations, the UE 102 can comprise an interface component 128 that can facilitate interacting with applications (e.g., 108, 110, 112, etc.) or users associated with the UE 102. The interface component 128 (e.g., API component) can comprise one or more interfaces, such as one or more APIs, that can facilitate communicating, presenting, or exposing data, which can be stored in or processed by components of the trusted zone environment of the UE 102, to one or more of the applications that are determined to be trusted and/or certified by the CM kernel component 114. The data can comprise, for example, data stored in the trusted memory component 116, data stored in the cache component, or data processed by the functional blocks or modem functions, wherein the trusted memory component 116, cache component, functional blocks, and/or modem functions also can be part of the trusted zone environment and/or can be embedded at the SOC level (e.g., on the SOC chip set).

The CM kernel component 114 facilitate controlling (e.g., adaptively controlling) access to information (e.g., stored in the trusted memory component or cache component) in the trusted zone environment associated with UE 102. The CM kernel component 114 also can operate to facilitate adaptively controlling certain resources (e.g., secure, embedded, and/or proprietary functional blocks or modem functions) of the UE 102, for example, in connection with using applications (e.g., 108, 110, 112, etc.) associated with the UE 102. The CM kernel component 114 also can facilitate adaptively controlling operation of the applications (e.g., 108, 110, 112, etc.) and the UE 102, and enhancing use of network resources of the communication network 106 in connection with use of applications by the UE 102 (e.g., by enabling dynamic communication-network optimization or enhancement practices), in accordance with defined communication enhancement criteria.

The CM kernel component 114 can be associated with (e.g., communicatively connected to) the set of functional blocks (e.g., 122, 124, 126, etc.) and the APIs of the interface component 128, wherein the CM kernel component 114, functional blocks, and/or the APIs can provide access control tools (e.g., intelligent access control tools), network enabler functions and observability APIs for network enhancement (e.g., network optimization), traffic flow monitoring and filtering, QOE executive routines, and traffic flow time shifting. The CM kernel component 114 also can perform or provide analytics (e.g., via employing analytics engines), cross-layer observability, security and firewall tags (e.g., security and firewall functionality embedded at the chip, SOC fabric, or interconnects), cache management at the SOC level (e.g., via the cache manager component and the cache component), and policy enforcement (e.g., in accordance with defined communication enhancement criteria).

Various other aspects and implementations of the CM kernel component 114 and other components of the UE 102 will be described herein. The CM kernel component 114 can control access to information stored in the trusted memory component 116 and access to the functional blocks (e.g., 122, 124, 126, etc.) of the UE 102 by an application (e.g., 108, 110, or 112) associated with the UE 102, in accordance with defined communication enhancement criteria. The defined communication enhancement criteria can comprise, for example, a criterion(s) (e.g., a defined trust criterion(s)) relating to a defined trust level associated with access to the trusted memory component 116 and the functional blocks (e.g., 122, 124, 126, etc.).

The CM kernel component 114 can facilitate receiving, collecting, or obtaining information relating to the communication network 106, traffic flows, and/or functional blocks (e.g., 122, 124, 126, etc.) of or associated with the UE 102. The CM kernel component 114 can map such information to, and/or store such information in, the trusted memory component 116. In some implementations, the CM kernel component 114 can receive, collect, or obtain information from control registers and analytics associated with the set of functional blocks (e.g., 122, 124, 126, etc.) of the UE 102. The CM kernel component 114 also can generate analytics information relating to the communication network 106, traffic flows, or the functional blocks (e.g., 122, 124, 126, etc.) based at least in part on information (e.g., a subset of the received, collected, or obtained information) relating to the communication network 106, traffic flows, and functional blocks (e.g., 122, 124, 126, etc.) of the UE 102. The CM kernel component 114 can store and/or map the information (e.g., received information, analytics information, etc.) relating to the communication network 106, traffic flows, and/or functional blocks (e.g., 122, 124, 126, etc.) of the UE 102 in or to the trusted memory component 116 of the UE 102.

The CM kernel component 114 can control access to the information stored in the trusted memory and access to the functional blocks (e.g., 122, 124, 126, etc.) by the application (e.g., 108) based at least in part on the defined communication enhancement criteria (e.g., comprising the defined trust criterion(s)) relating to the defined trust level. For instance, if the CM kernel component 114 determines that an application satisfies the defined trust criterion(s), the CM kernel component 114 can determine that the application is a trusted application that has established a defined trust level with the trusted zone environment, including the CM kernel component 114, trusted memory component 116, and the set of functional blocks (e.g., 122, 124, 126, etc.). A trusted application can be, for example, an application (e.g., 108) that was obtained (e.g., downloaded) from a trusted application store or source, and/or an application that has been certified as a trusted application by the CM kernel component 114 or another authorized certifying entity (e.g., associated with the trusted application store or source), and/or an application that has been authenticated by the CM kernel component 114 and/or has satisfied any other applicable criterion(s) specified by the defined trust criteria.

In response to determining that the application (e.g., 108) is a trusted application, the CM kernel component 114 can grant access rights to the trusted application to allow the trusted application to access the information stored in the trusted memory component 116 and access to use one or more of the functional blocks of the set of functional blocks (e.g., 122, 124, 126, etc.) of the UE 102. If the CM kernel component 114 determines that the application is not a trusted application, the CM kernel component 114 can deny access to the trusted memory component 116 and/or to all or some of the functional blocks of the set of functional blocks (e.g., 122, 124, 126, etc.) of the UE 102.

The CM kernel component 114 also can facilitate adaptively controlling the use and operation of functional blocks of the set of functional blocks (e.g., 122, 124, 126, etc.) in connection with applications (e.g., 108, 110, or 112) that are used by the UE 102. In some implementations, the CM kernel component 114 can monitor or track, and can receive or collect, information relating to the activity, behavior, and/or traffic flows (e.g., voice or data traffic flows) associated with the UE 102 and network-related conditions (e.g., network events, network state information, network-related triggers, network-related controls, etc.) associated with the communication network 106. The CM kernel component 114 can receive or obtain a portion of the information relating to the communication network 106 and/or traffic flow from one or more sensors or APIs (e.g., API subcomponents) associated with the UE 102. The CM kernel component 114 also can receive or obtain another portion of the information relating to the communication network 106 and/or traffic flow from the communication network 106.

The CM kernel component 114 can analyze the information relating to the activity, behavior, and/or traffic flows (e.g., voice or data traffic flows) associated with the UE 102 and network-related conditions to generate analysis results. As part of the analysis, the CM kernel component 114 can access and apply policy information (e.g., communication enhancement policy information), for example, obtained from a policy database (e.g., stored in a data store) of the UE 102. The policy information can be based at least in part on the defined communication enhancement criteria (e.g., which can be in accordance with desired optimization practices).

The CM kernel component 114 can determine a desired enhanced operation condition to employ in connection with a particular application (e.g., 108), based at least in part on the analysis results and policy data (e.g., from the policy database), in accordance with the defined communication enhancement criteria. For instance, the CM kernel component 114 can determine respective operational (e.g., switching) states or operational modes to employ for one or more of the respective functional blocks of the set of functional blocks (e.g., 122, 124, 126, etc.) that can utilized in connection with the particular application (e.g., 108), based at least in part on the analysis results, in accordance with the defined communication enhancement criteria. For example, the CM kernel component 114 can determine which, if any, functional blocks of the set of functional blocks (e.g., 122, 124, 126, etc.) can be accessed and used by the application (e.g., 108) based at least in part on whether the application is determined to be a trusted application that is permitted to access one or more of the functional blocks in the set, in accordance with the defined communication enhancement criteria (e.g., comprising the defined trust criterion(s)). In some implementations, there can be one or more functional blocks in the set that can be an open or non-secure (e.g., less secure or open) functional block(s) that is permitted to be used by trusted or non-trusted applications.

If the CM kernel component 114 determines that the application (e.g., 108) is a trusted application permitted to access at least a portion of the functional blocks or if it determines that a functional block(s) of the set is an open or non-secure (e.g., less secure or open) functional block(s) that is permitted to be used by trusted or non-trusted applications, the CM kernel component 114 can determine other aspects of the enhanced operation condition relating to such functional block(s) that is to be used in connection with the application (e.g., 108). For instance, the CM kernel component 114 can determine the respective operational (e.g., switch) states or modes of the respective functional blocks of the set of functional blocks, in accordance with the defined communication enhancement criteria. The CM kernel component 114 can determine, for example, which functional block(s) of the set to employ (e.g., determine which functional block(s) can be desirable (e.g., most favorable, best available, optimal, etc.) to employ), and, for a functional block(s) being employed, the desired (e.g., most favorable, best available, optimal, etc.) operational state or mode of that functional block(s). In accordance with the defined communication enhancement criteria, the functional block(s) employed also can be based at least in part on one or more preferences of the application (e.g., 108) or the UE user.

Based at least in part on such determinations, the CM kernel component 114 can control (e.g., adaptively control) and/or set the respective operational states or modes of the respective functional blocks of the set of functional blocks (e.g., 122, 124, 126, etc.), in accordance with the defined communication enhancement criteria. In some implementations, to facilitate controlling or setting of the respective operational states or modes of the respective functional blocks, the CM kernel component 114 can generate control instructions that can facilitate desirably switching or changing the operational states or modes of the respective functional blocks (e.g., 122, 124, 126, etc.) to facilitate enhancing (e.g., optimizing, acceptably improving or augmenting, etc.) operation of the UE 102 and/or the communication network 106. The CM kernel component 114 can communicate the control instructions to the set of functional blocks (e.g., 122, 124, 126, etc.), or a portion thereof, (e.g., via the kernel component or network resource manager component of the CM kernel component 114) to facilitate controlling the respective operational states or modes of the respective functional blocks of the set of functional blocks (e.g., 122, 124, 126, etc.).

In certain implementations, the CM kernel component 114 also can provide update information to the communication network 106 (e.g., the base station 104, or another component of the communication network 106 via the base station 104) to facilitate notifying the communication network 106 that the UE 102 is operating in accordance with the enhanced operation condition, in accordance with the defined communication enhancement criteria. The communication network 106 can use this information to facilitate implementing a desired network operational modification, if any, based at least in part on the enhanced operation condition employed by the UE 102, including the respective functional blocks of the set of functional blocks (e.g., 122, 124, 126, etc.), to facilitate desired operation of the communication network 106, in accordance with the defined communication enhancement criteria (e.g., in accordance with desired optimization practices).

The disclosed subject matter also can facilitate enabling an application or user to select desired functional blocks of the set of functional blocks (e.g., 122, 124, 126, etc.) of the UE 102 to facilitate performing operations in connection with the application (e.g., 108). In response to determining that the application is a trusted application, and/or the user is a trusted user, the CM kernel component 114 and/or the trusted memory component 116 can facilitate providing (e.g., presenting, exposing, communicating, etc.) information relating to the communication network 106, the traffic flow associated with the UE 102, and/or the functional blocks to the application (e.g., 108) and/or the user.

The information can comprise information received or collected by the CM kernel component 114, analytics information and/or analysis results generated by the CM kernel component 114 or the communication network 106 (e.g., by a network management component of the communication network 106), policy data, and/or other information. The CM kernel component 114 and/or the trusted memory component 116 can provide the information relating to the set of functional blocks (e.g., 122, 124, 126, etc.) to the application (e.g., 108) to facilitate notifying the application (e.g., 108) and/or user of the availability of all or a portion of the set of functional blocks of the UE 102. The information relating to the respective functional blocks also can relate to the respective functions (e.g., baseband functions) that can be performed by the respective functional blocks, as more fully disclosed herein.

The information also can comprise a recommendation(s) regarding an enhanced operation condition(s) as determined by the CM kernel component 114, in accordance with the defined communication enhanced criteria. The recommendation(s) regarding the enhanced operation condition(s) can, for example, indicate which functional block(s) and/or which operational state or mode of the functional block(s) can be desirable (e.g., most favorable, best available, optimal, etc.). Such information relating to the communication network 106, the traffic flow, and/or the functional blocks can be provided to the UE 102 and/or user via one or more interfaces of the interface component 128.

The application (e.g., 108) or associated user (e.g., using the UE 102) can analyze the information relating to the communication network 106 and traffic flow, and/or the information relating to the set of functional blocks (e.g., available functional blocks). The application (e.g., 108) or user can select one or more desired (e.g., favored, best available, optimal, etc.) functional blocks based at least in part on analysis results obtained from analyzing such information, a preference(s) of the application (e.g., 108) or user, and the defined communication enhancement criteria. The application (e.g., 108) or another component of the UE 102 can communicate selection information, which can relate to and indicate the one or more desired functional blocks that were selected by the application or user, to the CM kernel component 114.

The CM kernel component 114 can receive the selection information from the application (e.g., 108) or user (e.g., via an interface). The CM kernel component 114 can initialize (e.g., switch on and/or set an operational mode) the one or more desired (e.g., favored, best available, optimal, etc.) functional blocks (e.g., 122) of the set of functional blocks (e.g., 122, 124, 126, etc.) based at least in part on (e.g., in response to) the selection information, in accordance with the defined communication enhancement criteria. Such selection of the desired one or more functional blocks and setting of the operational state(s) and/or mode(s) of the desired one or more functional blocks can constitute an enhanced operation condition associated with the UE 102.

The CM kernel component 114 can facilitate establishing a communication connection between the application (e.g., 108) (and associated UE 102) and the communication network 106 to facilitate initiating a communication session associated with the application (e.g., 108), wherein the application can use the one or more desired functional blocks (e.g., 122) of the set of functional blocks (e.g., 122, 124, 126, etc.) during the communication session. The communication connection can be, for example, a 3G, 4G, or wi-fi communication connection.

In some implementations, the CM kernel component 114 can provide (e.g., communicate, present) update information to the communication network 106 (e.g., the base station 104, or another component of the communication network 106 via the base station 104) to facilitate notifying the communication network 106 that the UE 102 is operating in accordance with the enhanced operation condition, in accordance with the defined communication enhancement criteria. The communication network 106 can use this information to facilitate implementing a desired network operational modification, if any, based at least in part on the enhanced operation condition employed by the UE 102, including the respective functional blocks of the set of functional blocks (e.g., 122, 124, 126, etc.), to facilitate desired operation of the communication network 106, in accordance with the defined communication enhancement criteria (e.g., in accordance with desired optimization practices).

The disclosed subject matter also can facilitate authenticating an application associated with the UE 102 to facilitate controlling access to information and resources in the trusted zone environment of the UE 102. One or more of the applications (e.g., 108, 110, 112, etc.) associated with the UE 102 can be obtained (e.g., via download) from an application store or other source, can be installed on the UE 102, and/or can be accessible (e.g., through an application service or server via the communication network 106, or via another source). The CM kernel component 114 can determine whether the respective applications (e.g., 108, 110, 112, etc.) associated with the UE 102 are authenticated and/or certified to facilitate controlling access to resources (e.g., functional blocks and modem functions), access to the trusted memory component 116 and the data stored therein, access to the cache component, and/or access to other portions of the trusted zone environment.

The CM kernel component 114 can receive authentication information or certification information relating to a particular application (e.g., 108) from the application or another entity (e.g., application store or source of the application, a certifying entity that certifies applications, etc.). In some implementations, an application (e.g., 108) can be certified through an authorized application store or other authorized entity that is authorized to certify applications as being trusted with respect to the trusted zone environment, including the CM kernel component 114 and the trusted memory component 116, in accordance with the defined communication enhancement criteria (e.g., comprising the defined trust criteria). In other implementations, an application also can be self-certifying (e.g., automatically self-certifying), for example, by being able to provide information (e.g., authentication information, certification standards information, etc.), to the CM kernel component 114, that can indicate (e.g., prove) that the application satisfies the requirements for being certified as a trusted or certified application, in accordance with the defined communication enhancement criteria.

The CM kernel component 114 can analyze the authentication information or the certification information submitted by the application or other entity to facilitate determining whether the application is authenticated and/or certified to be a trusted or certified application. For instance, the CM kernel component 114 can analyze the authentication information to facilitate determining whether the authentication information is valid, for example, by matching corresponding authentication information stored in a data store associated with the CM kernel component 114, and/or whether the authentication information is sufficient to determine that the application is a trusted application, in accordance with the defined communication enhancement criteria. The CM kernel component 114 also can analyze the certification information to facilitate determining whether the certification information is sufficient to satisfy the defined trust criteria for determining the application to be a trusted application. For example, the CM kernel component 114 can analyze the certification information to facilitate determining whether the certification information is valid information and satisfies the set of certification standards relating to certification of an application as a trusted application.

The CM kernel component 114 can determine whether the application is authenticated or certified as a trusted application based at least in part on the analysis results. If the CM kernel component 114 determines that the application is a trusted application, the CM kernel component 114 can grant, to the application, access to all or a portion of the information stored in the trusted memory component 116 and/or access to all or a portion of the set of functional blocks (e.g., 122, 124, 126, etc.).

If the CM kernel component 114 determines that the application is not a trusted application, the CM kernel component 114 can deny the application access to all or a portion of the information stored in the trusted memory component 116 and/or deny access to all or a portion of the set of functional blocks (e.g., 122, 124, 126, etc.). For example, in connection with a non-trusted application, the CM kernel component 114 can deny access to the trusted memory component 116 (and the data stored therein), and can deny access to all or a portion of the functional blocks of the set, although, if any of the functional blocks are open functional blocks that are not part of the trusted zone environment, the CM kernel component 114 can permit the non-trusted application to use the open functional block(s) of the UE 102.

Figure 2:
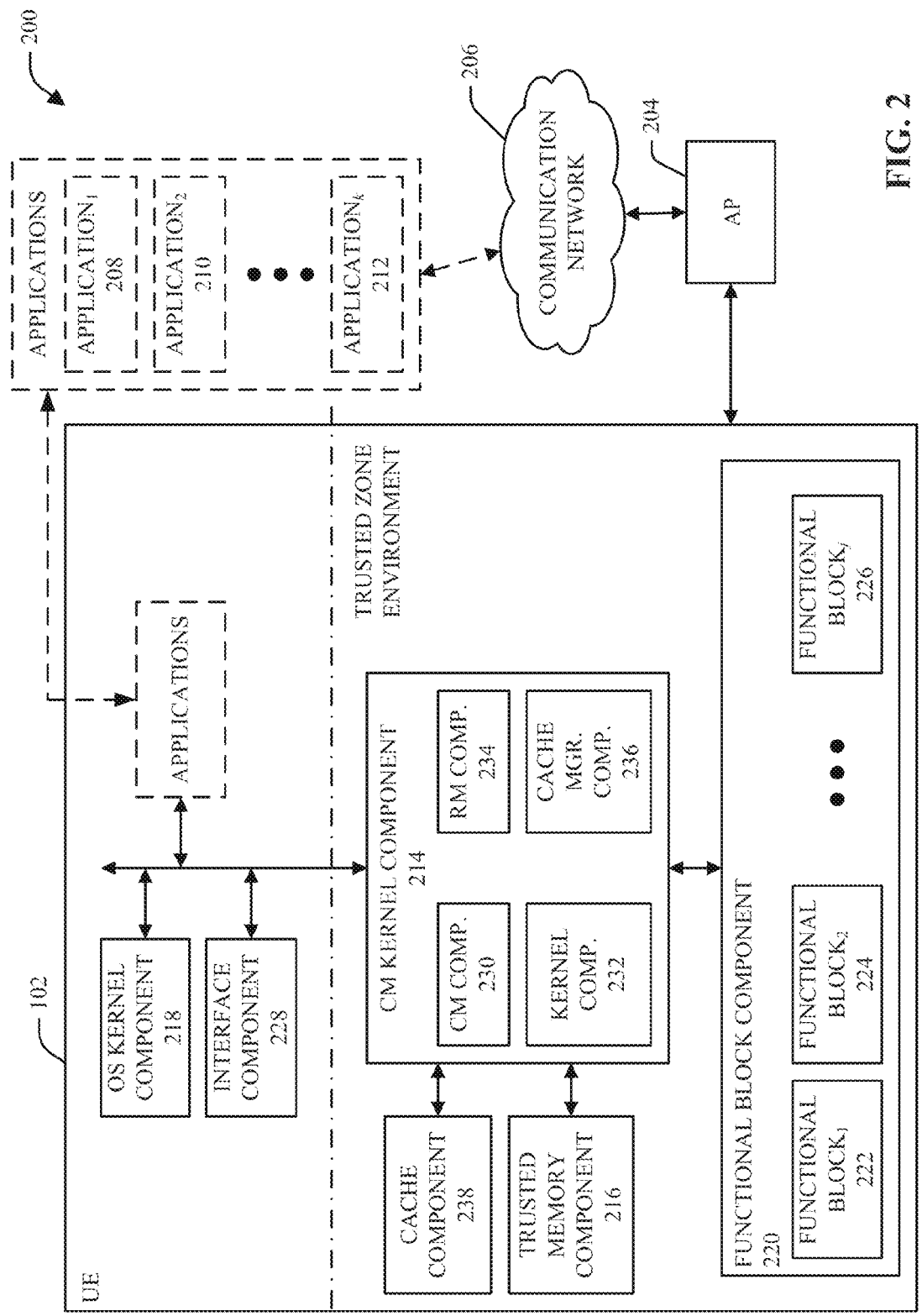
FIG. 2 a block diagram of another example system that can facilitate adaptively controlling a trusted memory and resources used in connection with applications employed by communication devices in a communication network, in accordance with various aspects and embodiments described herein.

FIG. 2 depicts a block diagram of another example system 200 that can facilitate adaptively controlling a trusted memory and resources (e.g., functional blocks) used in connection with applications employed by UEs (e.g., communication devices) in a communication network, in accordance with various aspects and embodiments described herein. The system 200 can comprise a UE 202, an AP 204, a communication network 206, a set of applications (e.g., comprising application$_1$ 208, application$_2$ 210, and/or (up through) application$_k$ 212), a CM kernel component 214, a trusted memory component 216, an OS kernel component 218, a functional block component 220 (e.g., comprising functional block$_1$ 222, functional block$_2$ 224, and/or (up through) functional block$_j$ 226), and an interface component 228. The respective components (e.g., UE 202, AP 204, communication network 206, applications, CM kernel component 214, trusted memory component 216, etc.) can comprise the respective features and functions, such as more fully described herein.

In accordance with various implementations and aspects, the CM kernel component 214 can comprise a connection manager component 230 (CM COMP. 230), a kernel component 232 (KERNEL COMP. 232), a resource manager component 234 (RM COMP. 234), and a cache manager component 236 (CACHE MGR. COMP. 236). The UE 202 also can comprise a cache component 238. The CM kernel component 214 and cache component 238 can be part of the trusted zone environment of the UE 202 and/or can be embedded at the SOC level (e.g., embedded on the SOC chip set).

The connection manager component 230 can facilitate controlling the establishing of communication connections between an application (and the UE 202) and the communication network 206 and/or a communication device associated with the communication network 206. The connection manager component 230 can operate to facilitate adaptively controlling certain resources (e.g., secure, embedded, and/or proprietary functional blocks) of the UE 202, for example, when using applications. The connection manager component 230 also can facilitate adaptively controlling operation of the applications (e.g., 208, 210, 212, etc.) and the UE 202, and enhancing use of network resources of the communication network 206 in connection with use of applications by the UE 202 (e.g., by enabling dynamic communication-network optimization or enhancement practices), in accordance with defined communication enhancement criteria.

In accordance with various aspects and implementations, the connection manager component 230 can perform a variety of functions based at least in part on the connection manager component 230 being aware of network-related information and/or traffic flow-related information and exposing such information to various APIs (e.g., which can be called to perform tasks) of the interface component 228 to facilitate performing the various functions. For instance, the connection manager component 230 can interact with applications (e.g., 208, 210, 212, etc.) and users of UEs (e.g., 202) via APIs, controls, components, etc. (e.g., network-aware APIs, controls, components, etc.), as more fully disclosed herein. The connection manager component 230 also can monitor the signal strength for each access network of the communication network 206 to facilitate determining whether or when to make a hand-off of the UE 202 from one access network to another access network and/or determining how the respective operations of the respective functional blocks are to be controlled, in accordance with the defined communication enhancement criteria. The connection manager component 230 also can facilitate triggering hand-offs of the UE 202 from one access network to another access network.

In some implementations, the connection manager component 230 can perform access arbitration to facilitate arbitrating between different access networks to facilitate determining which access network the UE 202 is to utilize, link arbitration to facilitate arbitrating between different communication links to facilitate determining which link the UE 202 is to use to communicate traffic, and/or QOS arbitration to facilitate arbitrating between different QOS requests associated with different traffic flows or applications to facilitate determining respective QOS parameters for the respective traffic flows or applications. The connection manager component 230 also can perform data synchronization to synchronize data being respectively communicated using respective applications (e.g., 208, 210, and/or 212, etc.) employed by the UE 202.

The connection manager component 230 also can provide network awareness to the applications (e.g., 208, 210, 212, etc.) by providing (e.g., presenting, exposing, communicating, etc.) network-related information and/or traffic flow-related information to the applications (e.g., 208, 210, 212, etc.), as more fully disclosed herein. The connection manager component 230 further determine and generate recommendations for enhanced operation conditions (e.g., in accordance with enhanced or optimized practices), and can provide such recommendations for enhanced operation conditions to the applications and/or users of the UEs (e.g., 202), as more fully disclosed herein.

The kernel component 232 can facilitate performing various kernel functions in connection with operation of the UE 202. The CM kernel component 232 can comprise a dedicated kernel that can facilitate performing certain operations comprising, for example, managing certain input/output data requests (e.g., from software and/or an application), translating certain requests into instructions (e.g., data processing instructions) for execution by a processor component or other component (e.g., a functional block(s)) of the UE 202, etc.

The resource manager component 234 can facilitate performing resource manager-related functions for the UE 202. For example, the resource manager component 234 can facilitate managing certain resources (e.g., functional blocks comprising baseband functions, modem blocks comprising modem functions, etc.) contained on (e.g., embedded at the SOC level on) the UE 202 and/or performing other desired operations in connection with such resources of the UE 202.

The system 200 also can employ 3G, 4G, and wi-fi technology to facilitate voice and data communications, wherein 3G drivers, 4G drivers, and wi-fi drivers can be used by the UE 202 to facilitate communicating voice or data via a 3G, 4G, or wi-fi wireless communication connection, respectively. The resource manager component 234 (e.g., interconnect baseband manager) can be associated with the 3G drivers, 4G drivers, wi-fi drivers, and connection manager component 230. The resource manager component 234 can facilitate controlling operation (e.g., controlling switching or operational modes) of the respective functional blocks (e.g., embedded baseband functions) of the set of functional blocks (functional block$_1$ 222, functional block$_2$ 224, functional block$_j$ 226, etc.) of the functional block component 220, as more fully disclosed herein.

In some implementations, the connection manager component 230 and/or resource manager component 234 can facilitate controlling access to the trusted memory component 216 and the data stored therein, in accordance with the defined communication enhancement criteria. For instance, the connection manager component 230 and/or resource manager component 234 can allow access to data and/or expose data stored in the trusted memory component 216 to applications (e.g., certified and/or authenticated applications) determined to be trusted by the CM kernel component 214, wherein the data stored in the trusted memory component 216 can be exposed to a trusted application via one or more interfaces (e.g., APIs) of the interface component 228.

The cache manager component 236 can facilitate controlling access to and use of the cache component 238, which can be used to cache or temporarily store data associated with an application (e.g., 208) or UE user. The cache component 238 can comprise a set of memory buffers (e.g., buffer memory sub-components) that can be employed to store (e.g., temporarily store) data and provide stored data. The cache component 238 can comprise volatile and/or nonvolatile memory.

Information associated with an application (e.g., 208) can be stored in the cache component 238 for a variety of reasons, such as, for example, desiring to temporarily store data in the cache component 238 until a particular condition(s) occurs, enabling various of pieces to be collected and stored in the cache component 238 until all desired pieces of data have been collected, etc. The cache manager component 236 can store the set of information associated with the application (e.g., 208) in the cache component 238. The set of information can comprise data relating to the application (e.g., 208), UE user, communication network 206, or other factors or entities. The cache manager component 236 can receive (e.g., from the application, communication network 206, user, etc.), and/or the CM kernel component 214 or resources (e.g., functional block(s)) associated with the CM kernel component 214 can generate information that can be included in the set of information stored in the cache component 238.

The cache manager component 236 can specify and set the condition(s) or can receive condition setting information from the application (e.g., 208) or user that can facilitate setting or specifying the condition(s) by the cache manager component 236. The condition(s) can relate to a network-related condition associated with the communication network 206, a traffic flow-related condition associated with the traffic flow, a UE-related condition associated with the UE 202, an application-related condition associated with the application (e.g., 208), a user-related condition associated with the UE user, and/or another type of condition (e.g., condition(s) relating to a date, an amount or type of data, etc.).

The cache manager component 236 can set the type of processing to be performed on the set of information in response to an occurrence of the condition(s) relating to the processing of the set of information. The type of processing can be set based at least in part on processing-related information received from the application or user, or can be determined by the CM kernel component. In some implementations, depending in part on the information being collected, the application (e.g., 208), the condition(s) associated with storing the set of information, and/or the type of processing to be performed on the set of information, information can continue to be collected and stored in the cache component 238 with the set of information, for example, until the condition(s) has been satisfied, has been detected, or has occurred.

The cache manager component 236 can monitor or track the conditions associated with the communication network, traffic flow, communication device, application, user, and/or other type(s) of condition, to facilitate determining or detecting whether the condition(s) associated with the set of information has been satisfied, has been detected, or has occurred. If the cache manager component 236 or another component (e.g., connection manager component 230, resource manager component 234, a sensor(s) (e.g., traffic load sensor, network-congestion sensor, etc.), etc.) detect or determine that the condition(s) has been satisfied or has occurred, the cache manager component 236 can facilitate processing the set of information, and/or providing the set of information to another component (e.g., functional block, application, etc.) for processing, based at least in part on the type of processing to be performed on the set of information.

For example, the type of processing can be to retrieve the set of information from the cache component 238 and transmit the set of information to the application or user. In such instance, the cache manager component 236 can retrieve or read the set of information from the cache component 238 and can transmit the set of information to the application (e.g., 208) or to the UE user via a desired interface.

As another example, the type of processing can be to retrieve the set of information from the cache component, perform one or more operations (e.g., evaluations, calculations, compression or decompression, encryption or decryption, DRM-related operations, etc.) on the set of information to generate processed information, and transmit the processed information to the application or user. In such instance, the cache manager component 236 can retrieve or read the set of information from the cache component 238, can send the set of information to one or more functional blocks (e.g., 222, 224, and/or 226), wherein one or more operations can be performed on the set of information by the one or more functional blocks to generate processed data based at least in part on the type of processing to be performed on the set of information. The connection manager component 230 and/or resource manager component 234 can facilitate communicating the processed data and/or the set of information from the one or more functional to the application (e.g., 208) or to the UE user via a desired interface.

Figure 3:
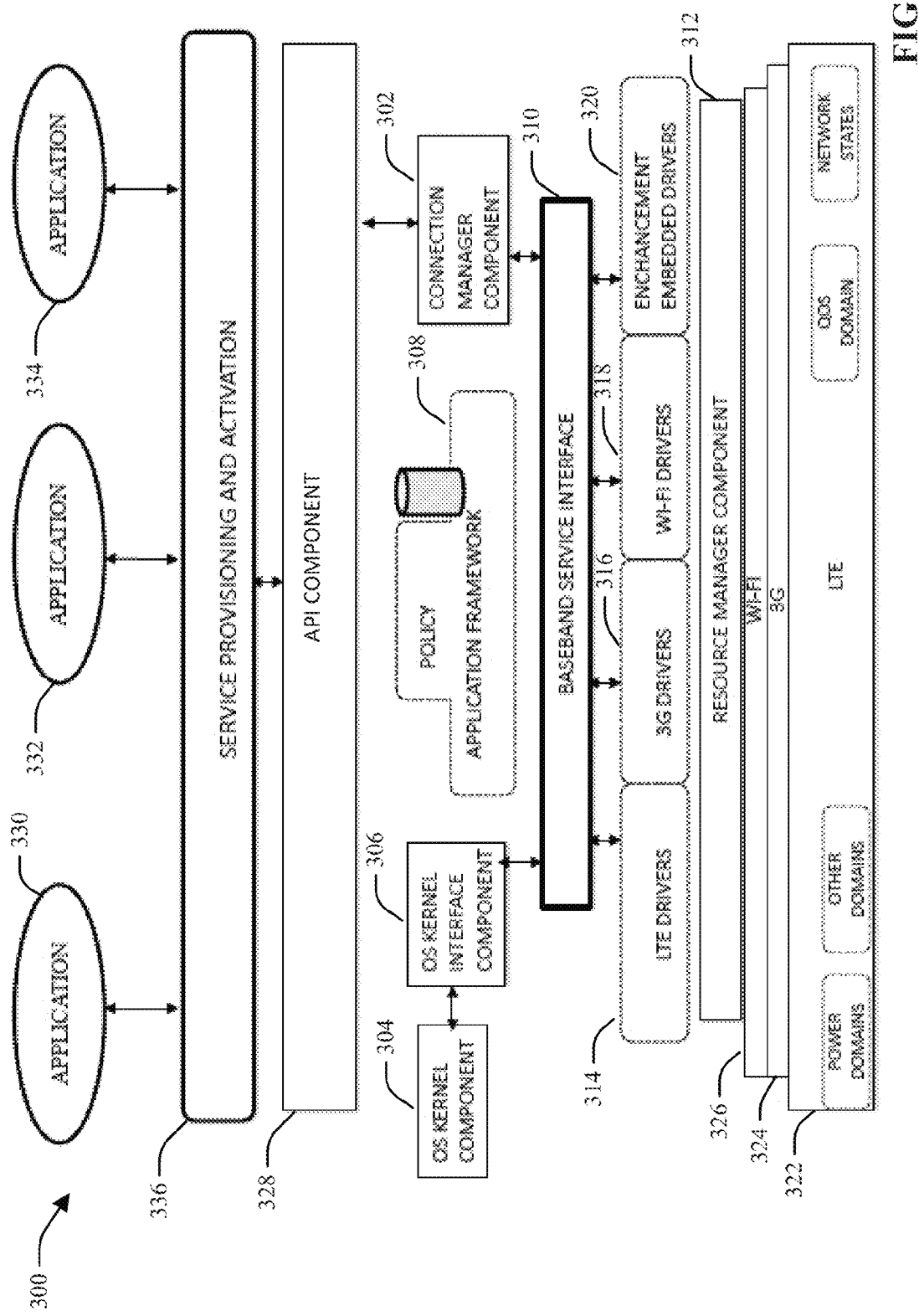
FIG. 3 illustrates a diagram of still another example system that can facilitate adaptively controlling access to and use of a trusted memory and resources (e.g., functional blocks) used for applications employed by communication devices in a communication network, in accordance with various aspects and embodiments described herein.

FIG. 3 illustrates a diagram of an example system 300 that can facilitate adaptively controlling access to and use of trusted memory and resources (e.g., functional blocks) used for applications employed by communication devices (e.g., UEs) in a communication network, in accordance with various aspects and embodiments described herein. The system 300 can be part of a UE, for example, to facilitate enhanced communications by the UE in a communication network. The system 300 can comprise a CM kernel component 302 that can perform various functions to facilitate adaptively controlling access to and use of trusted memory and adaptively controlling functional blocks, comprising secure and/or embedded functional blocks, to facilitate desired (e.g., enhanced, optimal, favorable, acceptable, etc.) operation of the UE and/or the communication network, as more fully disclosed herein.

The system 300 also can comprise an OS kernel component 304 that can be associated with an OS kernel interface component 306. The OS kernel component 304 (e.g., rich OS kernel) can be employed to facilitate performing operations by the UE, including, for example, managing input/output data requests (e.g., from software and/or an application), translating requests into instructions (e.g., data processing instructions) for execution by a processor component or other component of the UE, etc. The OS kernel component 304 can be associated with (e.g., communicatively connected to) the CM kernel component 114 (e.g., via the OS kernel interface component 306, a bus, and/or an interface (e.g., baseband service interface component 310)).

The system 300 also can comprise a policy application framework 308 that can be employed to store policy data and other information that can facilitate adaptively controlling operation of the functional blocks (e.g., embedded functional blocks) and/or other resources of the UE to facilitate desired operation of the UE and/or the communication network, as more fully disclosed herein. The policy data can comprise network-related data and/or traffic flow-related data, for example. The CM kernel component 302 can update the policy data based in part on additional or new network-related data and/or traffic flow-related data received from various network-aware APIs, controls, components, etc.

The CM kernel component 302 can access the policy data maintained in the policy database or table stored in a data store of the policy application framework 308 via an interface component (e.g., the baseband service interface component 310) and/or a bus. The CM kernel component 302 can facilitate controlling operation of the respective functional blocks (e.g., embedded functional blocks) based at least in part on the policy data. The CM kernel component 302 also can facilitate determining whether an application is a trusted or certified application and/or controlling access by an application (e.g., trusted or certified application) to the trusted memory component (not shown in FIG. 3) or the cache memory (not shown in FIG. 3) based at least in part on the policy data.

The baseband service interface component 310 (e.g., micro core baseband service interface) can be associated with (e.g., communicatively connected to) the CM kernel component 302 to facilitate enabling the CM kernel component 302 to access or interact with the resource manager component 312 (e.g., which can be at the baseband level), long term evolution (LTE) drivers 314 (e.g., 4G drivers), 3G drivers 316, wi-fi drivers 318, and enhancement (e.g., optimization) embedded drivers 320. The resource manager component 312 can be associated with and can facilitate managing various resources, such as LTE resources 322, 3G resources 324, and wi-fi resources 326, wherein at least a portion of the resources can be functional blocks that can perform various types of functions (e.g., data compression, location detection, data encryption, etc.). It is to be appreciated and understood that, while the baseband service interface component 310 and the resource manager component 312 are depicted in FIG. 3 as being separate components from the CM kernel component 302, the disclosed subject matter is not so limited. In accordance with various implementations, the CM kernel component can comprise the baseband service interface component and/or the resource manager component (e.g., as depicted in FIG. 2).

The CM kernel component 302 can be associated with an API component 328 that can be or can comprise an application service interface, and can make available various APIs (e.g., open and/or network-aware APIs) that can be employed to facilitate obtaining network-related information and/or traffic flow-related information that can be used by the CM kernel component 302 to facilitate controlling, and making determinations regarding, operation of functional blocks, such as the embedded functional blocks, as more fully disclosed herein.

The system 300 also can comprise a plurality of applications, such as application 330, application 332, and application 334, that can perform various functions or services (e.g., process data, present video or audio content, communicate or receive voice or data, etc.). The applications (e.g., 330, 332, 334, etc.) can be associated with a service provisioning and activation layer or component 336, which can be associated with the API component 328. Via the service provisioning and activation layer or component 336, the applications (e.g., 330, 332, 334, etc.) and/or UE user can be exposed to or can access network-related information and traffic flow-related information, such as the information obtained or derived by the APIs of the API component 328. The applications (e.g., 330, 332, 334, etc.) and/or UE user can review operation recommendations received from the CM kernel component 302 and/or can make decisions or determinations regarding the operation of the application and/or functional blocks, as more fully disclosed herein.

Figure 4:
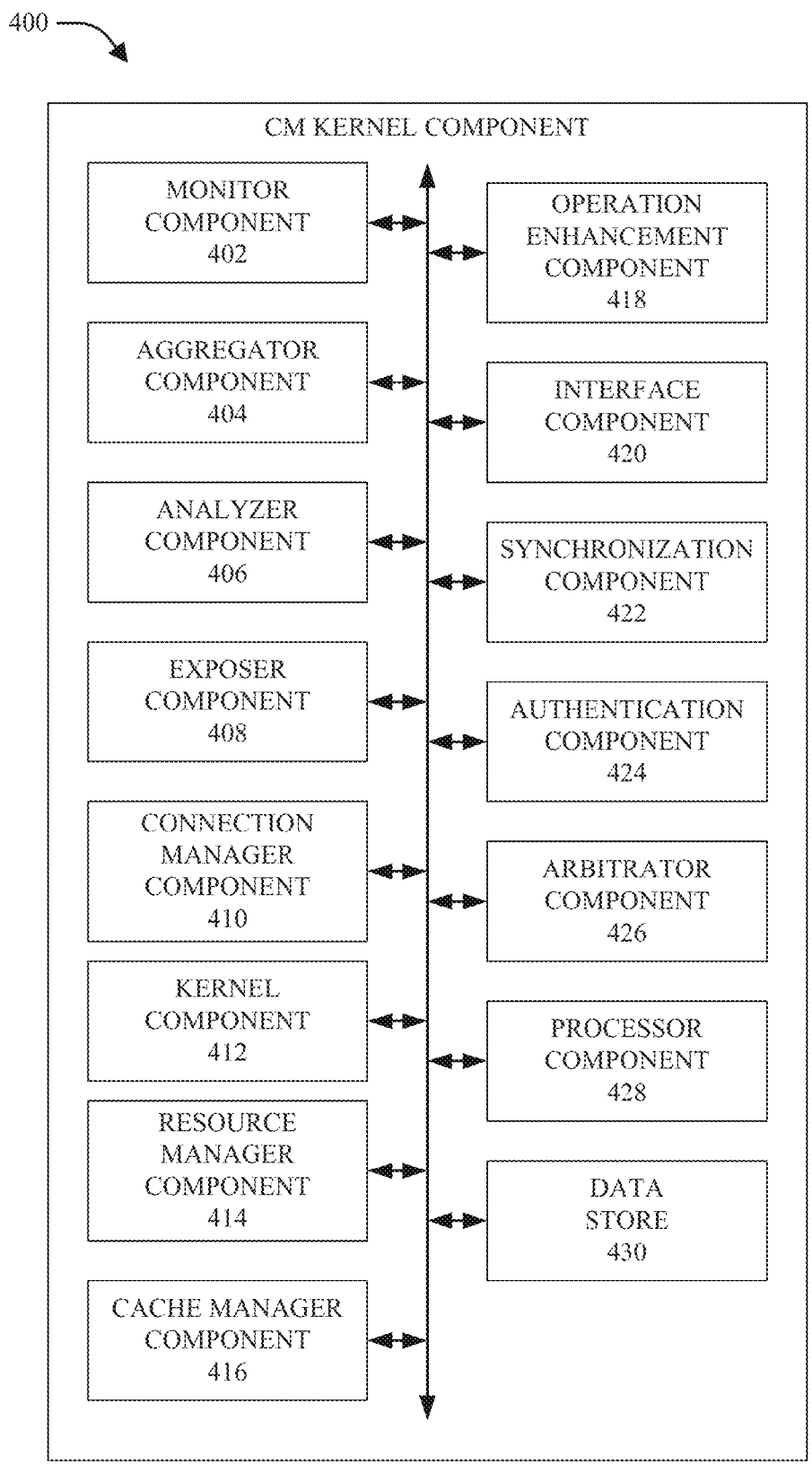
FIG. 4 depicts a block diagram of an example connection-manager kernel component in accordance with various aspects and embodiments of the disclosed subject matter.

FIG. 4 depicts a block diagram of an example CM kernel component 400 in accordance with various aspects and embodiments of the disclosed subject matter. The CM kernel component 400 can be employed by a UE to facilitate adaptively controlling access to and use of trusted memory and operation of resources, such as functional blocks (e.g., embedded or secure functional blocks), of the UE, in accordance with various aspects and embodiments described herein.

The CM kernel component 400 can comprise a monitor component 402 that can monitor or track activity, behavior, and/or traffic flows (e.g., voice or data traffic flows) associated with the UE. The monitor component 402 also can monitor or track network-related conditions (e.g., network state information, network-related triggers, network-related controls, etc.) associated with the communication network. The monitor component 402 can monitor or track signal strength for each access network of the communication network.

The CM kernel component 400 can include an aggregator component 404 that can aggregate data received (e.g., obtained) from various entities (e.g., monitor component 402 or another component(s) of the CM kernel component 400, communication network, application, a server or other communication device, processor, data store, etc.). The aggregator component 404 can correlate respective items of data based at least in part on type of data (e.g., video content, audio content, textual data, metadata, etc.), application to which the data relates, source of the data, time or date the data was generated or received, etc., to facilitate analyzing of the data by the analyzer component 406. For example, the aggregator component 404 can aggregate data relating to an application and/or other data (e.g., data relating to the communication network) to facilitate determining whether respective functional blocks (e.g., embedded or secure functional blocks) of a subset of functional blocks associated with the CM kernel component 400 are to be enabled (e.g., switched to an on state) or disabled (e.g., switched to an off state) in connection with the application.

The CM kernel component 400 can include the analyzer component 406, which can analyze data to facilitate determining whether an application is a trusted and/or certified application, determining whether an application is permitted to access the trusted memory component or resources in the trusted zone environment of the UE, determining whether respective functional blocks of a subset of functional blocks (e.g., associated with the CM kernel component 400) are to be enabled or disabled, generating a recommendation regarding the enabling or disabling of respective blocks in connection with an application, controlling the enabling and disabling of respective functional blocks, providing or exposing network-related information and traffic flow-related information to an application(s) or a user, etc., and can generate analysis results, based at least in part on the data analysis. For example, the analyzer component 406 can analyze information relating to network-related information and traffic flow-related information associated with the communication network and/or UE, and can generate analysis results that can facilitate determining whether respective functional blocks of a subset of functional blocks (e.g., associated with the kernel component) are to be enabled or disabled in connection with an application used by the UE.

The CM kernel component 400 can include an exposer component 408 that can provide, present, or expose information to applications of the UE, a user of the UE, or various components of the UE. The exposer component 408 can facilitate providing, presenting, or exposing information stored in the trusted memory component (e.g., to a trusted application) and/or information stored in the cache component. The exposer component 408 also can provide, present, or expose information relating to various functional blocks (e.g., embedded or secure functional blocks) that are available on the UE (e.g., in the partitioned area of the UE via the kernel component) to applications of the UE and/or the UE user. The exposer component 408 further can provide, present, or expose network-related information (e.g., network conditions, network states, network-related notifications, network events, network triggers, etc.) and traffic flow-related information (e.g., traffic flow associated with the UE) to applications of the UE and/or the UE user.

In accordance with various implementations, the CM kernel component 400 also can comprise a connection manager component 410, a kernel component 412, a resource manager component 414, and a cache manager component 416. The respective components (e.g., connection manager component 410, kernel component 412, resource manager component 414, cache manager component 416) can comprise the respective features and functions, such as more fully described herein.

The CM kernel component 400 can comprise an operation enhancement component 418 that can facilitate determining whether respective functional blocks (e.g., embedded or secure functional blocks) of the subset of functional blocks associated with the kernel component are to be enabled or disabled in connection with the application, based at least in part on analysis results relating to an analysis of the network-related information and the traffic flow-related information, in accordance with the defined communication enhancement criteria. The operation enhancement component 418 can facilitate controlling (e.g., adaptively controlling) the operation (e.g., switching states or operational modes) of the functional blocks based at least in part on a determination regarding whether respective functional blocks of the subset of functional blocks associated with the kernel component are to be enabled or disabled. The operation enhancement component 418 can facilitate generating and sending, to the kernel component 412, instructions indicating respective switching states or operational modes that are to be used for respective functional blocks associated with the CM kernel component 400.

The operation enhancement component 418 also can generate an operation enhancement recommendation relating to an enhanced operation condition (e.g., a preferred enhanced operation condition), and can facilitate sending the operation enhancement recommendation to an application or UE user for consideration. The operation enhancement recommendation can specify desirable (e.g., preferred, optimal, enhanced, favorable, etc.) respective switching states or operational modes that can be used for respective functional blocks associated with the CM kernel component 400 in connection with an application, in accordance with the defined communication enhancement criteria.

The CM kernel component 400 also can comprise an interface component 420 that can comprise one or more interfaces, including APIs (e.g., open or network-aware APIs), and/or can interact with one or more interfaces, including APIs that can facilitate obtaining network-related information and traffic flow-related information. The APIs associated with the interface component 420 also can facilitate communicating or exposing the network-related information and traffic flow-related information to applications or users associated with the UE. For example, the interface component 420 or another component of the CM kernel component 400 can call or initialize an API associated with the interface component 420 to facilitate having that API perform one or more functions that the API is configured to perform. The APIs can comprise, for example, a traffic-load-aware API(s), a network-congestion-aware API(s), a network-state notification API(s), an application-state notification API(s), a data-delivery-service API(s) (e.g., a time-shift-data-delivery-service API), and/or other network-aware APIs, among other APIs that can be employed by or interacted with by the interface component 420.

The CM kernel component 400 also can include a synchronization component 422 that can perform data synchronization to synchronize data being respectively communicated using respective applications employed by the UE. For example, the data synchronization can be performed with respect to data delivery in connection with an application, wherein the CM kernel component 400 can facilitate scheduling data delivery (e.g., adjusting scheduling of data delivery, time-shifting data delivery (e.g., micro-shifting data delivery, macro-shifting data delivery)) to or from the UE in connection with an application.

The CM kernel component 400 can comprise an authentication component 424 that can facilitate authenticating the kernel component 412 of the UE, an application associated with the UE, a user associated with the UE, and/or other entities or components associated with the UE based at least in part on respective credentials of the kernel component 412, applications, UE users, or other entities or components associated with the UE. For instance, the authentication component 424 can perform authentication on the application to facilitate determining whether the application is a trusted or certified application, and/or can perform authentication on the kernel component 412, UE user, and/or application to facilitate determining whether access to and use of the subset of functional blocks (e.g., embedded or secure functional blocks) associated with the CM kernel component 400 is to be permitted or granted to the UE user or application. The authentication component 424 can request that the kernel component 412, UE user, or application provide authentication information (e.g., a valid authentication credential, a valid authentication or security token, application certification-related information, etc.) that can indicate that the UE user or application is authorized to access and use the subset of functional blocks associated with the CM kernel component 400, and/or can indicate that the application is a trusted or certified application that can be permitted to access the trusted zone environment of the UE, including the trusted memory component, the cache component, and/or the set of functional blocks.

The authentication component 424 can analyze the received authentication information, and can compare such authentication information to stored authentication information (e.g., stored in the data store) to facilitate determining whether the received authentication information matches stored authentication information associated with (e.g., mapped to) the UE user or application. With respect to whether an application is trusted or certified, if the received authentication information and/or certification information matches the corresponding stored authentication information and/or certification information, the authentication component 424 can determine that the application is a trusted and/or certified application, and can grant access rights to the application to access or use the trusted memory component and/or the cache component, and/or the data respectively stored therein. If the received authentication information and/or certification information does not match the corresponding stored authentication information and/or certification information, the authentication component 424 can determine that the application is not a trusted and/or certified application, and can deny access to the trusted memory component and/or the cache component, and/or the data respectively stored therein.

With respect to the functional blocks, if the received authentication information matches the corresponding stored authentication information, the authentication component 424 can grant access rights to the UE user or application to use the subset of functional blocks, wherein the CM kernel component 400 can be employed to facilitate controlling the switching states or operational modes of the functional blocks of the subset of functional blocks in connection with operation of the application. If the received authentication information does not match the corresponding stored authentication information, the authentication component 424 can deny use of the subset of functional blocks to the UE user or application and/or the subset of functional blocks can remain invisible to the UE user, application, and/or other components of the UE in the open area of the UE.

Access or use rights to the subset of functional blocks associated with the CM kernel component 400 can be limited to users or applications associated with a particular communication service provider, for example, wherein, if communication services are being provided to the UE via the particular communication service provider, the subset of functional blocks can be available for use by the UE, UE user, or application, and, if communication services are being provided to the UE via another communication service provider, the authentication component 424 can restrict or deny access to and use of the subset of functional blocks associated with the kernel component. For instance, the particular service provider can provide the kernel component 412 with a token or other authentication information (e.g., a security token or other authentication credential), and the kernel component 412 can provide that token to the connection manager component 410 and/or the authentication component 424 to facilitate authenticating the UE user, application, and/or kernel component 412.

The CM kernel component 400 can include an arbitrator component 426 that can arbitrate between respective features, between respective functions, between respective techniques, between QOSs, between respective links, etc. For example, the arbitrator component 426 can perform access arbitration to facilitate arbitrating between different access networks to facilitate determining which access network the UE is to utilize. The arbitrator component 426 can perform link arbitration to facilitate arbitrating between different communication links to facilitate determining which link the UE is to use to communicate traffic. The arbitrator component 426 also can perform QOS arbitration to facilitate arbitrating between different QOS requests associated with different traffic flows or applications to facilitate determining respective QOS parameters for the respective traffic flows or applications.

The CM kernel component 400 can comprise a processor component 428 that can work in conjunction with the other components (e.g., monitor component 402, aggregator component 404, analyzer component 406, etc.) to facilitate performing the various functions of the CM kernel component 400. The processor component 428 can employ one or more processors, microprocessors, or controllers that can process data, such as information relating to applications, users, the communication network, traffic flows, interfaces, APIs, functional blocks, determining whether to switch on or off or change operational modes of functional blocks, authentication, mappings, policies, defined communication enhancement criteria, algorithms, protocols, interfaces, tools, and/or other information, to facilitate operation of the CM kernel component 400, as more fully disclosed herein, and control data flow between the CM kernel component 400 and other components (e.g., communication network, base station, an application, a server or other communication device, a cloud, etc.) associated with the CM kernel component 400.

The CM kernel component 400 also can include a data store 430 that can store data structures (e.g., user data, metadata), code structure(s) (e.g., modules, objects, hashes, classes, procedures) or instructions, information relating to applications, users, the communication network, traffic flows, interfaces, APIs, functional blocks, determining whether to switch on or off or change operational modes of functional blocks, authentication, mappings, policies, defined communication enhancement criteria, algorithms, protocols, interfaces, tools, and/or other information, to facilitate controlling operations associated with the CM kernel component 400. In an aspect, the processor component 428 can be functionally coupled (e.g., through a memory bus) to the data store 430 in order to store and retrieve information desired to operate and/or confer functionality, at least in part, to the monitor component 402, aggregator component 404, analyzer component 406, etc., and/or substantially any other operational aspects of the CM kernel component 400.

Figure 5:
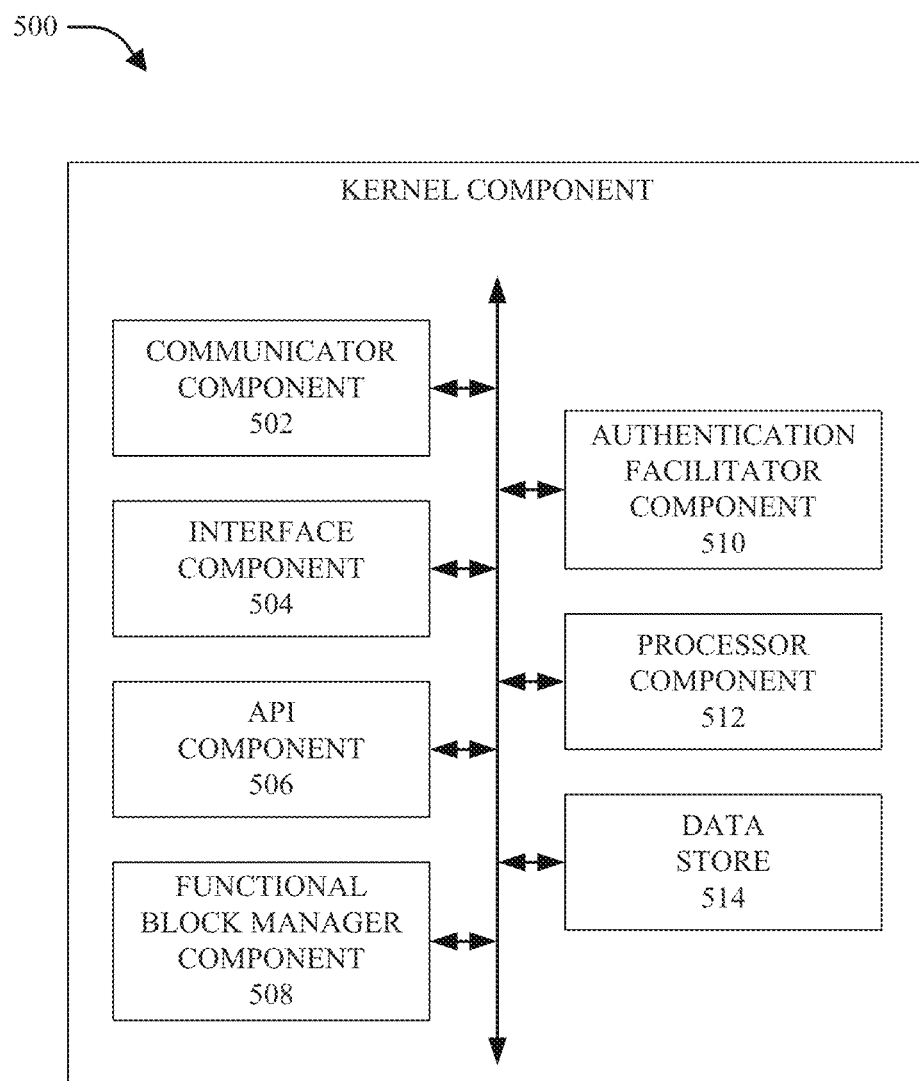
FIG. 5 presents a block diagram of an example kernel component in accordance with various aspects and embodiments of the disclosed subject matter.

FIG. 5 depicts a block diagram of an example kernel component 500 in accordance with various aspects and embodiments of the disclosed subject matter. The kernel component 500 can be employed by a UE to facilitate controlling (e.g., adaptively controlling) operation of resources, such as functional blocks (e.g., embedded or secure functional blocks) and modem functions, of the UE, in accordance with various aspects and embodiments described herein.

The kernel component 500 can comprise a communicator component 502 that can facilitate controlling communication of data between the functional blocks associated with the kernel component 500 and the connection manager component, applications, processor component, and/or data store, etc. The communicator component 502 also can facilitate controlling communication of data between dedicated memory associated with the kernel component 500 and the connection manager component, applications, processor component, and/or data store, etc. The communicator component 502 further can facilitate controlling communication of data between a dedicated processor component or dedicated processor resources associated with the kernel component 500 and the connection manager component, applications, processor component, and/or data store, etc. The communicator component 502 also can facilitate establishing secure communication between the kernel component 500 and the communication network to facilitate desired (e.g., proper, acceptable, enhanced, optimal, etc.) cross-layer enhancement or optimization practices, in accordance with the defined communication enhancement criteria, including practices or capabilities relating to, for example, compression and decompression of data, rate shaping, event notification to the communication and event notification from the communication network to UE subsystems or components of the UE.

The kernel component 500 also can comprise an interface component 504 that can facilitate providing various interfaces, tools, and/or protocols to, for example, the connection manager component, applications associated with the UE, and/or processor component, etc., to facilitate enabling the kernel component 500 and/or the other components perform various functions that can facilitate enhancing the operation of the UE and the communication network, including desirably and adaptively controlling operation of the functional blocks associated with the kernel component 500, in accordance with the defined communication enhancement criteria.

The kernel component 500 also can comprise an API component 506 that can comprise or can interact with various APIs (e.g., open or network-aware) APIs) that can perform various functions and can facilitate obtaining network-related information (e.g., network conditions, states, notifications, events, triggers, etc.) and traffic flow-related information (e.g., traffic flow-related conditions, states, notifications, events, triggers, etc.) associated with the communication network or UE. The APIs associated with the API component 506 can facilitate communicating or exposing the network-related information and traffic flow-related information to applications or users associated with the UE. For example, the API component 506 or another component of or associated with the kernel component 500 can call or initialize an API associated with the API component 506 to facilitate having that API perform one or more functions that the API is configured to perform. The APIs can comprise, for example, a traffic-load-aware API(s), a network-congestion-aware API(s), a network-state notification API(s), an application-state notification API(s), a data-delivery-service API(s) (e.g., a time-shift-data-delivery-service API), and/or other network-aware APIs, among other APIs that can be employed by or interacted with by the API component 506.

The kernel component 500 can comprise a functional block manager component 508 that can facilitate controlling operation of the respective functional blocks of a subset of functional blocks (e.g., embedded, secure, or proprietary) associated with the kernel component 500. For instance, the functional block manager component 508 can facilitate controlling the respective switching states (e.g., on state, off state) or operational modes (e.g., first type of operational mode, second type of operational mode, etc.) of the respective functional blocks of the subset of functional blocks, in accordance with the defined communication enhancement criteria. The various functional blocks can perform respective functions (e.g., data compression or decompression, location detection, data encryption or decryption, interference mitigation, etc.), such as more fully described herein.

In some implementations, the kernel component 500 can include an authentication facilitator component 510 that can comprise one or more tokens, such as authentication or security tokens, or authentication information that can facilitate controlling access to and use of the subset of functional blocks by applications and a UE user. For instance, the one or more tokens, or authentication information, can be employed to facilitate authenticating the kernel component 500, an application, or a UE user with the connection manager component of the UE to facilitate enabling access to and use of the functional blocks of the subset of functional blocks during operation of the UE (e.g., operation of an application associated with the UE) in the communication network. In certain implementations, access or use rights to the subset of functional blocks associated with the kernel component 500 can be limited to users or applications associated with a particular communication service provider, for example, wherein, if communication services are being provided to the UE via the particular communication service provider, the subset of functional blocks can be available for use by the UE, UE user, or application, and, if communication services are being provided to the UE via another communication service provider, access to and use of the subset of functional blocks associated with the kernel component 500 can be restricted or prohibited. For example, the particular service provider can provide the kernel component 500 with a token or other authentication information (e.g., a security token or other authentication credential), and the kernel component 500 can provide that token to the connection manager component to facilitate authenticating the UE user, application, and/or kernel component 500.

The kernel component 500 can comprise a processor component 512 that can work in conjunction with the other components (e.g., communicator component 502, interface component 504, API component 506, etc.) to facilitate performing the various functions of the kernel component 500. The processor component 512 can employ one or more processors, microprocessors, or controllers that can process data, such as information relating to applications, users, the communication network, traffic flows, APIs, functional blocks, determining whether to switch on or off or change operational modes of functional blocks, authentication, policies, defined communication enhancement criteria, algorithms, protocols, interfaces, tools, and/or other information, to facilitate operation of the kernel component 500, as more fully disclosed herein, and control data flow between the kernel component 500 and other components (e.g., connection manager component, kernel interface component, functional blocks, communication network, base station, an application, a server or other communication device, a cloud, etc.) associated with the kernel component 500.

The kernel component 500 also can include a data store 514 that can store data structures (e.g., user data, metadata), code structure(s) (e.g., modules, objects, hashes, classes, procedures) or instructions, information relating to applications, users, the communication network, traffic flows, APIs, functional blocks, determining whether to switch on or off or change operational modes of functional blocks, authentication, policies, defined communication enhancement criteria, algorithms, protocols, interfaces, tools, and/or other information, to facilitate controlling operations associated with the kernel component 500. In an aspect, the processor component 512 can be functionally coupled (e.g., through a memory bus) to the data store 514 in order to store and retrieve information desired to operate and/or confer functionality, at least in part, to the communicator component 502, interface component 504, API component 506, etc., and/or substantially any other operational aspects of the kernel component 500.

Figure 6:
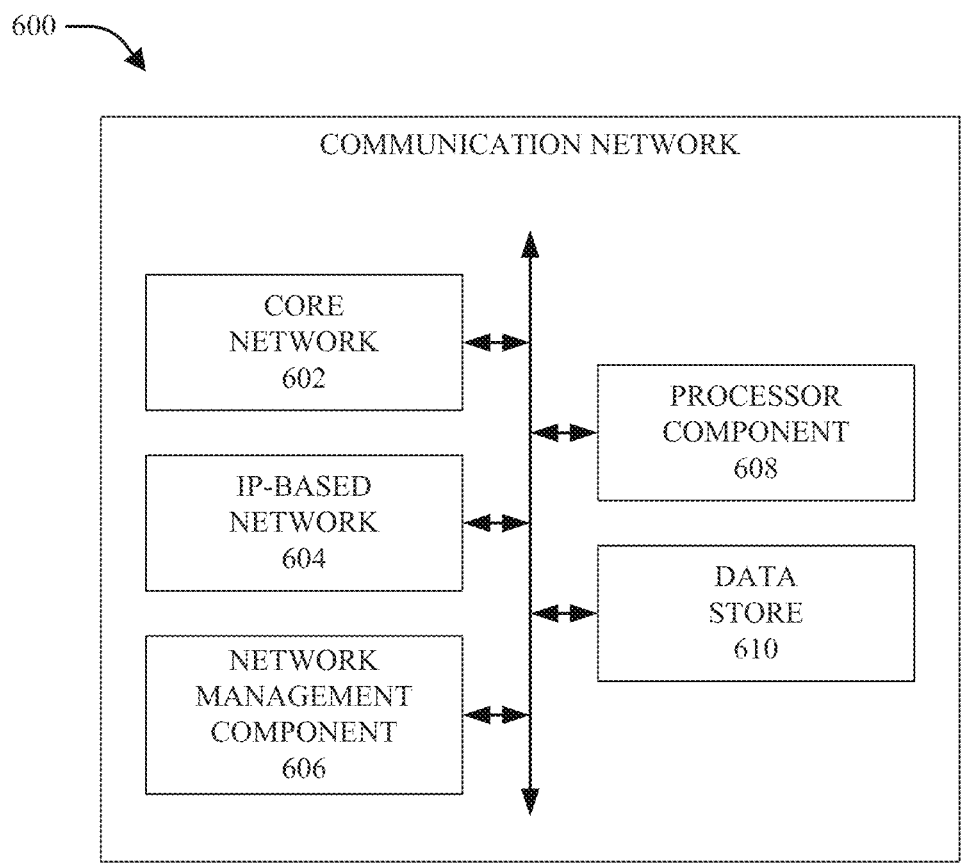
FIG. 6 illustrates a block diagram of an example communication network in accordance with various aspects and embodiments of the disclosed subject matter.

FIG. 6 illustrates a block diagram of an example communication network 600 in accordance with various aspects and embodiments of the disclosed subject matter. The communication network 600 can include a core network 602 (e.g., mobile core network) that can facilitate communications by UEs wirelessly connected to the communication network 600. A UE can be communicatively connected to the core network 602 via an AP (e.g., base station). The core network 602 can facilitate wireless communication of voice and data associated with communication devices, such as UEs, associated with the communication network 600. The core network 602 can facilitate routing voice and data communications between UEs and/or other communication devices (e.g., phone, computer, email server, multimedia server, audio server, video server, news server, financial or stock information server, other communication devices associated with an IP-based network 604 (e.g., the Internet), etc.) associated with the communication network 600. The core network 602 also can allocate resources to the UEs associated with the communication network 600 in the communication network environment, convert or enforce protocols, establish and enforce QoS for the UEs, provide applications or services in the network, translate signals, and/or perform other desired functions to facilitate system interoperability and communication in the wireless communication network. The core network 602 further can include desired components, such as routers, nodes (e.g., general packet radio service (GPRS) nodes, such as serving GPRS support node (SGSN), gateway GPRS support node (GGSN), etc.), switches, interfaces, controllers, etc., that can facilitate communication of data between communication devices associated with the communication network 600.

The communication network 600 can include the IP-based network 604, which can facilitate communications by communication devices (e.g., UEs) that are connected to the communication network 600 via a wireless connection, or a wireline or landline connection. For example, a UE can be communicatively connected to the IP-based network 604 via a wireless communication connection with the core network 602, wherein the UE can communicate with other communication devices connected to the communication network 600. A UE can transmit messages, use applications, access or download content, etc., via the core network 602 and/or the IP-based network 604, or another communication network (not shown).

The communication network 600 can contain a network management component 606 that can control operations and functions associated with the communication network 600. The network management component 606 also can track, and analyze information relating to, resource usage by the communication network 600, particularly the core network 602, in relation to servicing the UE or other UEs, resource usage by a UE associated with the communication network 600, wireless state transitions associated with the UE or other UEs, user behavior or activity, application behavior or activity, and/or other factors, to facilitate controlling operations and functions associated with the communication network 600. The network management component 606 also can facilitate presenting or making available information (e.g., network-related information, traffic flow-related information, etc.) relating to the communication network 600 to UEs associated with the communication network 600 to facilitate enhanced operation of the UEs and the communication network 600, in accordance with the defined communication enhancement criteria. The network management component 606 can facilitate applying communication enhancement rules (e.g., based on or corresponding to the defined communication enhancement criteria), protocols, and/or algorithms, to facilitate controlling and/or enhancing operation of the communication network 600.

The communication network 600 also can include a processor component 608 that can work in conjunction with (and/or be part of) the other components (e.g., core network 602, IP-based network 604, network management component 606, etc.) to facilitate performing the various functions of the communication network 600. The processor component 608 can employ one or more processors, microprocessors, or controllers that can process data, such as information relating to wireless or wireline communications; applications; users; network-related conditions, states, or events; traffic flow-related conditions, states, or events; network resources or functions; a mapping; and/or other information, to facilitate operation of the communication network 600, as more fully disclosed herein, and control data flow between the communication network 600 and other components (e.g., UE, base station, an application, a server or other communication device, a cloud, etc.) associated with the communication network 600.

The communication network 600 also can include a data store 610 that can store data structures (e.g., user data, metadata), code structure(s) (e.g., modules, objects, hashes, classes, procedures) or instructions, information relating to wireless or wireline communications; applications; users; network-related conditions, states, or events; traffic flow-related conditions, states, or events; network resources or functions; a mapping; and/or other information, to facilitate controlling operations associated with the communication network 600. In an aspect, the processor component 608 can be functionally coupled (e.g., through a memory bus) to the data store 610 in order to store and retrieve information desired to operate and/or confer functionality, at least in part, to the core network 602, IP-based network 604, network management component 606, etc., and/or substantially any other operational aspects of the communication network 600.

Figure 7:
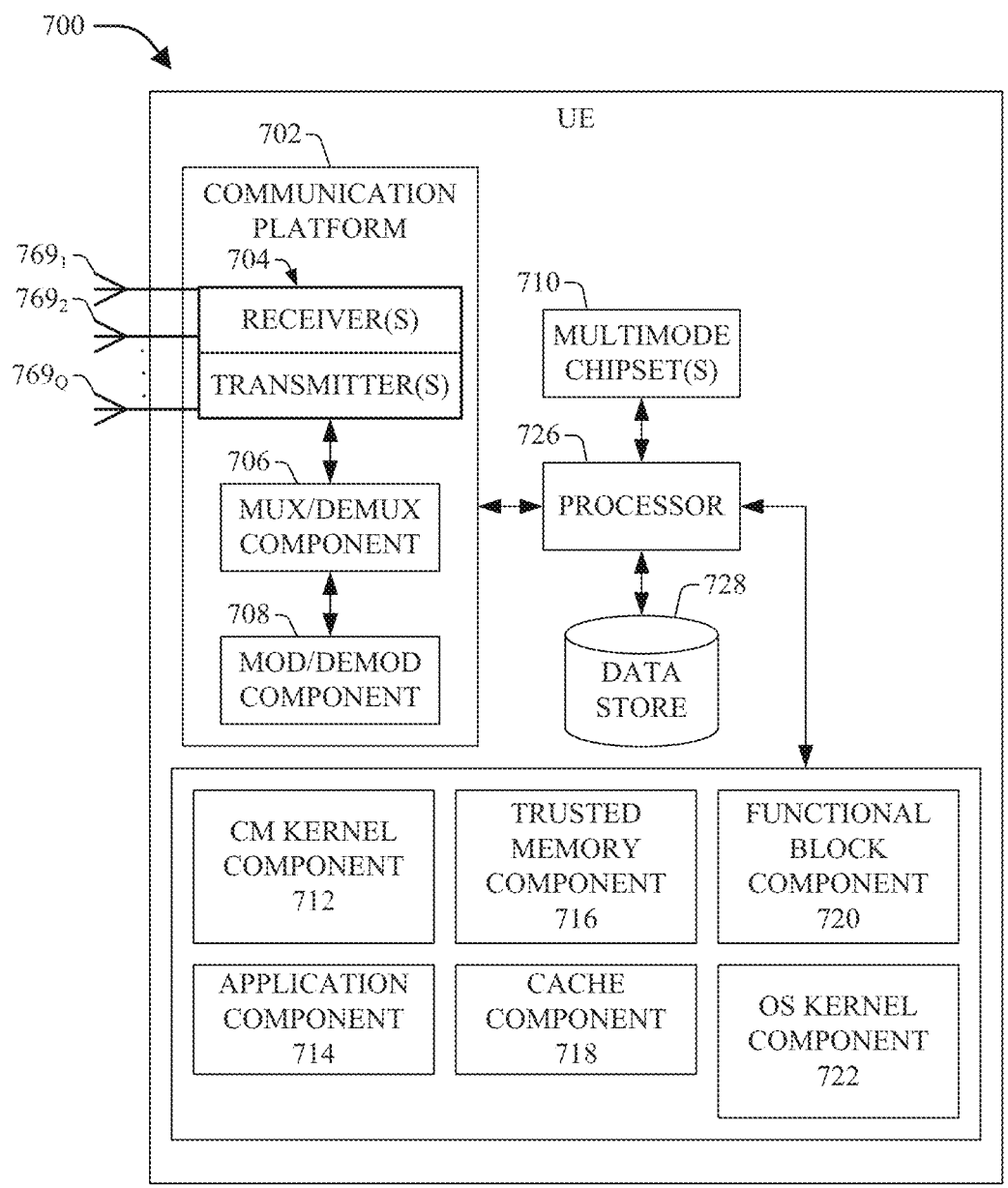
FIG. 7 depicts a block diagram of an example user equipment (UE) in accordance with an aspect of the disclosed subject matter.

FIG. 7 depicts a block diagram of an example UE 700 in accordance with an aspect of the disclosed subject matter. In an aspect, the UE 700 can be a multimode access terminal, wherein a set of antennas $769_1$-$769_Q$ (Q is a positive integer) can receive and transmit signal(s) from and to wireless devices like access points, access terminals, wireless ports and routers, and so forth, that operate in a radio access network. It should be appreciated that antennas $769_1$-$769_Q$ can be part of the communication platform 702, which can comprise electronic components and associated circuitry that can provide for processing and manipulation of received signal(s) and signal(s) to be transmitted, e.g., by receivers and transmitters 704, multiplexer/demultiplexer (mux/demux) component 706, and modulation/demodulation (mod/demod) component 708.

In another aspect, the UE 700 can include a multimode operation chipset(s) 710 that can allow the UE 700 to operate in multiple communication modes in accordance with disparate technical specification for wireless technologies. In an aspect, multimode operation chipset(s) 710 can utilize communication platform 702 in accordance with a specific mode of operation (e.g., voice, GPS). In another aspect, multimode operation chipset(s) 710 can be scheduled to operate concurrently (e.g., when Q>1) in various modes or within a multitask paradigm.

In accordance with various implementations, the UE 700 can comprise a CM kernel component 712, an application component 714, a trusted memory component 716, a cache component 718, a functional block component 720 (e.g., comprising a set of functional blocks (e.g., embedded or secure functional blocks, and/or open functional blocks), and an OS kernel component 722. The respective components (e.g., CM kernel component 712, application component 714, trusted memory component 716, cache component 718, functional block component 720, OS kernel component 722) can comprise the respective features and functions, such as more fully described herein.

The UE 700 also can include a processor(s) 724 that can be configured to confer functionality, at least in part, to substantially any electronic component within the UE 700, in accordance with aspects of the disclosed subject matter. The processor(s) 724 can facilitate enabling the UE 700 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. The processor(s) 724 also can facilitate enabling the UE 700 to process data relating to messaging, voice calls, applications, services, wireless states, users, the communication network (e.g., network-related conditions, states, notifications, events, etc.), traffic flows (e.g., traffic flow-related conditions, states, notifications, events, etc.), APIs, functional blocks, determining whether to switch on or off or change operational modes of functional blocks, authentication, mappings, defined communication enhancement criteria, etc.

The UE 700 also can contain a data store 726 that can store data structures (e.g., user data, metadata); code structures (e.g., modules, objects, classes, procedures) or instructions; message hashes; data relating to messaging, voice calls, applications, services, wireless states, users, the communication network (e.g., network-related conditions, states, notifications, events, etc.), traffic flows (e.g., traffic flow-related conditions, states, notifications, events, etc.), APIs, functional blocks, determining whether to switch on or off or change operational modes of functional blocks, authentication, mappings, defined communication enhancement criteria, and/or other data; user policies; network or device information like policies and specifications; attachment protocols; code sequences for scrambling, spreading and pilot (e.g., reference signal(s)) transmission; frequency offsets; cell IDs; encoding algorithms; compression algorithms; decoding algorithms; decompression algorithms; etc. In an aspect, the processor(s) 724 can be functionally coupled (e.g., through a memory bus) to the data store 726 in order to store and retrieve information (e.g., data structures; code structures; instructions; algorithms; data relating to messaging, voice calls, applications, services, wireless states, users, the communication network (e.g., network-related conditions, states, notifications, events, etc.), traffic flows (e.g., traffic flow-related conditions, states, notifications, events, etc.), APIs, functional blocks, determining whether to switch on or off or change operational modes of functional blocks, authentication, mappings, defined communication enhancement criteria, etc.) desired to operate and/or confer functionality, at least in part, to the communication platform 702, multimode operation chipset(s) 710, CM kernel component 712, application component 714, trusted memory component 716, cache component 718, functional block component 720, OS kernel component 722, and/or substantially any other operational aspects of the UE 700.

Figure 8:
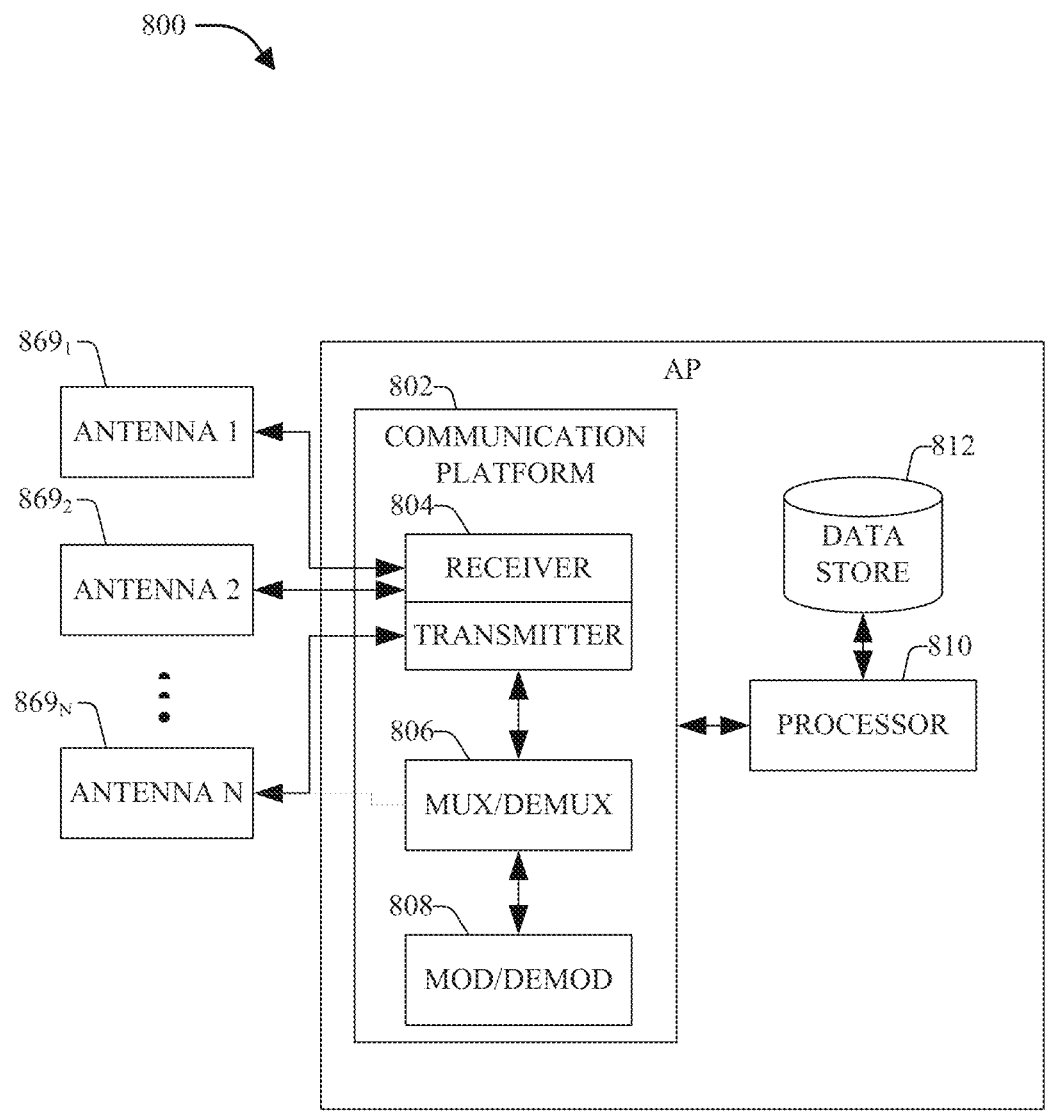
FIG. 8 illustrates a block diagram of an example access point in accordance with an aspect of the disclosed subject matter.

FIG. 8 illustrates a block diagram of an example AP 800 (e.g., femtocell, picocell, macro base station, etc.) in accordance with an aspect of the disclosed subject matter. The AP 800 can receive and transmit signal(s) from and to wireless devices like access points (e.g., femtocells, picocells, base stations, etc.), access terminals (e.g., UEs), wireless ports and routers, and the like, through a set of antennas $869_1$-$869_N$. In an aspect, the antennas $869_1$-$869_N$ are a part of a communication platform 802, which comprises electronic components and associated circuitry that can provide for processing and manipulation of received signal(s) and signal(s) to be transmitted. In an aspect, the communication platform 802 can include a receiver/transmitter 804 that can convert signal from analog to digital upon reception, and from digital to analog upon transmission. In addition, receiver/transmitter 804 can divide a single data stream into multiple, parallel data streams, or perform the reciprocal operation.

In an aspect, coupled to receiver/transmitter 804 can be a multiplexer/demultiplexer (mux/demux) 806 that can facilitate manipulation of signal in time and frequency space. The mux/demux 806 can multiplex information (e.g., data/traffic and control/signaling) according to various multiplexing schemes such as, for example, time division multiplexing (TDM), frequency division multiplexing (FDM), orthogonal frequency division multiplexing (OFDM), code division multiplexing (CDM), space division multiplexing (SDM), etc. In addition, mux/demux component 806 can scramble and spread information (e.g., codes) according to substantially any code known in the art, e.g., Hadamard-Walsh codes, Baker codes, Kasami codes, polyphase codes, and so on. A modulator/demodulator (mod/demod) 808 also can be part of the communication platform 802, and can modulate information according to multiple modulation techniques, such as frequency modulation, amplitude modulation (e.g., M-ary quadrature amplitude modulation (QAM), with M a positive integer), phase-shift keying (PSK), and the like.

The AP 800 also can comprise a processor(s) 810 that can be configured to confer and/or facilitate providing functionality, at least partially, to substantially any electronic component in or associated with the AP 800. For instance, the processor(s) 810 can facilitate operations on data (e.g., symbols, bits, or chips) for multiplexing/demultiplexing, modulation/demodulation, such as effecting direct and inverse fast Fourier transforms, selection of modulation rates, selection of data packet formats, inter-packet times, etc., to facilitate between an associated UE and the communication network.

In another aspect, the AP 800 can include a data store 812 that can store data structures; code instructions; rate coding information; information relating to measurement of radio link quality or reception of information related thereto; information relating to establishing a communications connection between a communication device (e.g., UE) and other communication devices; system or device information like policies and specifications; code sequences for scrambling; spreading and pilot transmission; floor plan configuration; access point deployment and frequency plans; scheduling policies; and so on. The processor(s) 810 can be coupled to the data store 812 in order to store and retrieve information (e.g., information relating to multiplexing/demultiplexing or modulation/demodulation, information relating to radio link levels, information relating to establishing communication connections associated with a UE(s) served by the AP 800, etc.) desired to operate and/or confer functionality to the communication platform 802, and/or other operational components of AP 800.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methods that can be implemented in accordance with the disclosed subject matter can be further appreciated with reference to flowcharts in FIGS. 9-13. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 9:
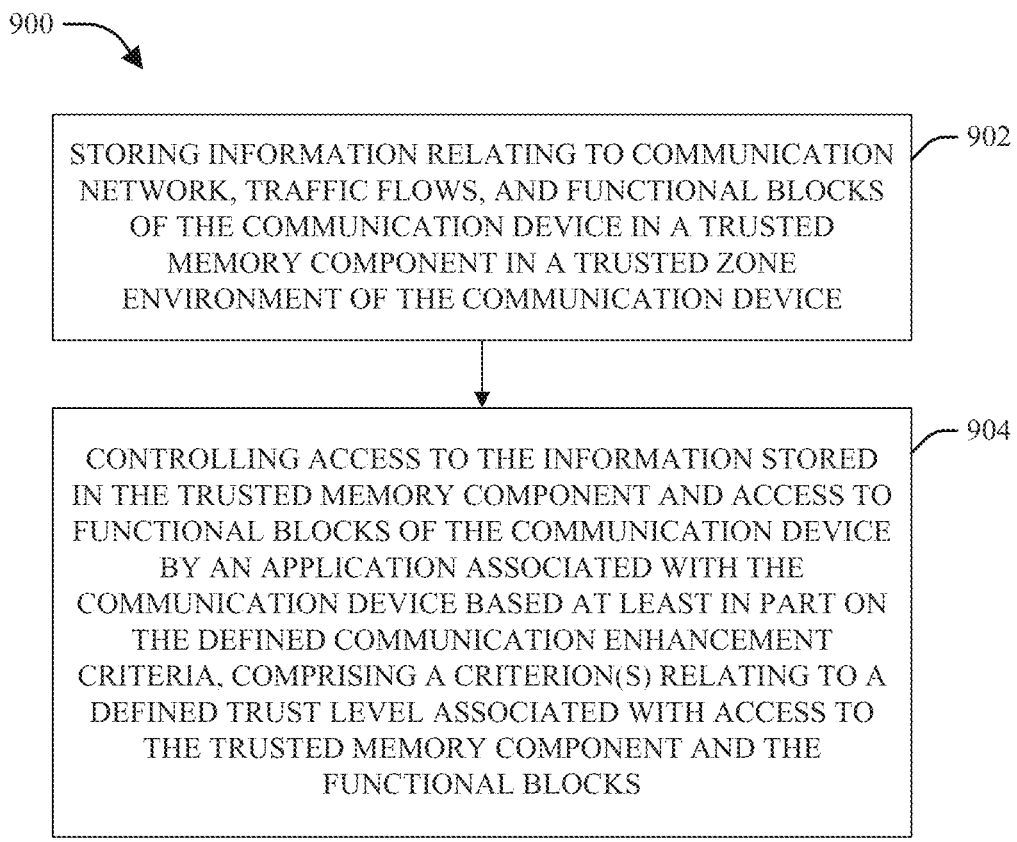
FIG. 9 illustrates a flow diagram of an example method that can facilitate controlling access to information and resources associated with a communication device in a communication network, in accordance with various aspects and embodiments described herein.

FIG. 9 illustrates a flow chart of an example method 900 that can facilitate controlling (e.g., adaptively controlling) access to information and resources (e.g., functional blocks) associated with a communication device (e.g., UE) in a communication network, in accordance with various aspects and embodiments described herein. In accordance with various aspects, the method 900 can be employed by, for example, a CM kernel component and/or a trusted memory component of the communication device.

At 902, information relating to communication network, traffic flows, and functional blocks of the communication device can be stored in a trusted memory component in a trusted zone environment of the communication device. The CM kernel component can facilitate receiving, collecting, or obtaining information relating to communication network, traffic flows, and functional blocks of the communication device, and can map such information to, and/or store such information in, the trusted memory component. In some implementations, the CM kernel component can receive, collect, or obtain information from control registers and analytics associated with the set of functional blocks of the communication device. The CM kernel component also can generate analytics information relating to the communication network, traffic flows, or the functional blocks based at least in part on information (e.g., a subset of information) relating to communication network, traffic flows, and functional blocks of the communication device. The CM kernel component can store and/or map the information (e.g., received information, analytics information, etc.) relating to communication network, traffic flows, and functional blocks of the communication device in or to the trusted memory component of the communication device.

At 904, access to the information stored in the trusted memory component and access to the functional blocks of the communication device by an application associated with the communication device can be controlled based at least in part on the defined communication enhancement criteria, comprising a criterion(s) relating to a defined trust level associated with access to the trusted memory component and the functional blocks. The CM kernel component can control access to the information stored in the trusted memory component and access to the functional blocks by the application based at least in part on the criterion(s) (e.g., trust criterion(s)) relating to the defined trust level associated with access to the trusted memory component and the functional blocks. For instance, if the CM kernel component determines that an application satisfies the trust criterion(s), the CM kernel component can determine that the application is a trusted application that has (e.g., satisfies) a defined trust level with the trusted zone environment, including the CM kernel component, trusted memory component, and the set of functional blocks. A trusted application can be, for example, an application that was obtained (e.g., downloaded) from a trusted application store or source, and/or an application that has been certified as a trusted application by the CM kernel component or another authorized certifying entity (e.g., associated with the trusted application store or source), and/or an application that has been authenticated by the CM kernel component and/or has satisfied any other applicable criterion(s) specified by the defined trust criteria.

In response to determining that the application is a trusted application, the CM kernel component can grant access rights to the trusted application to allow the trusted application to access the information stored in the trusted memory component and access to use one or more of the functional blocks of the set of functional blocks of the communication device. In response to determining that the application is not a trusted application, the CM kernel component can deny access to the trusted memory component and/or to all or some of the functional blocks of the set of functional blocks of the communication device.

Figure 10:
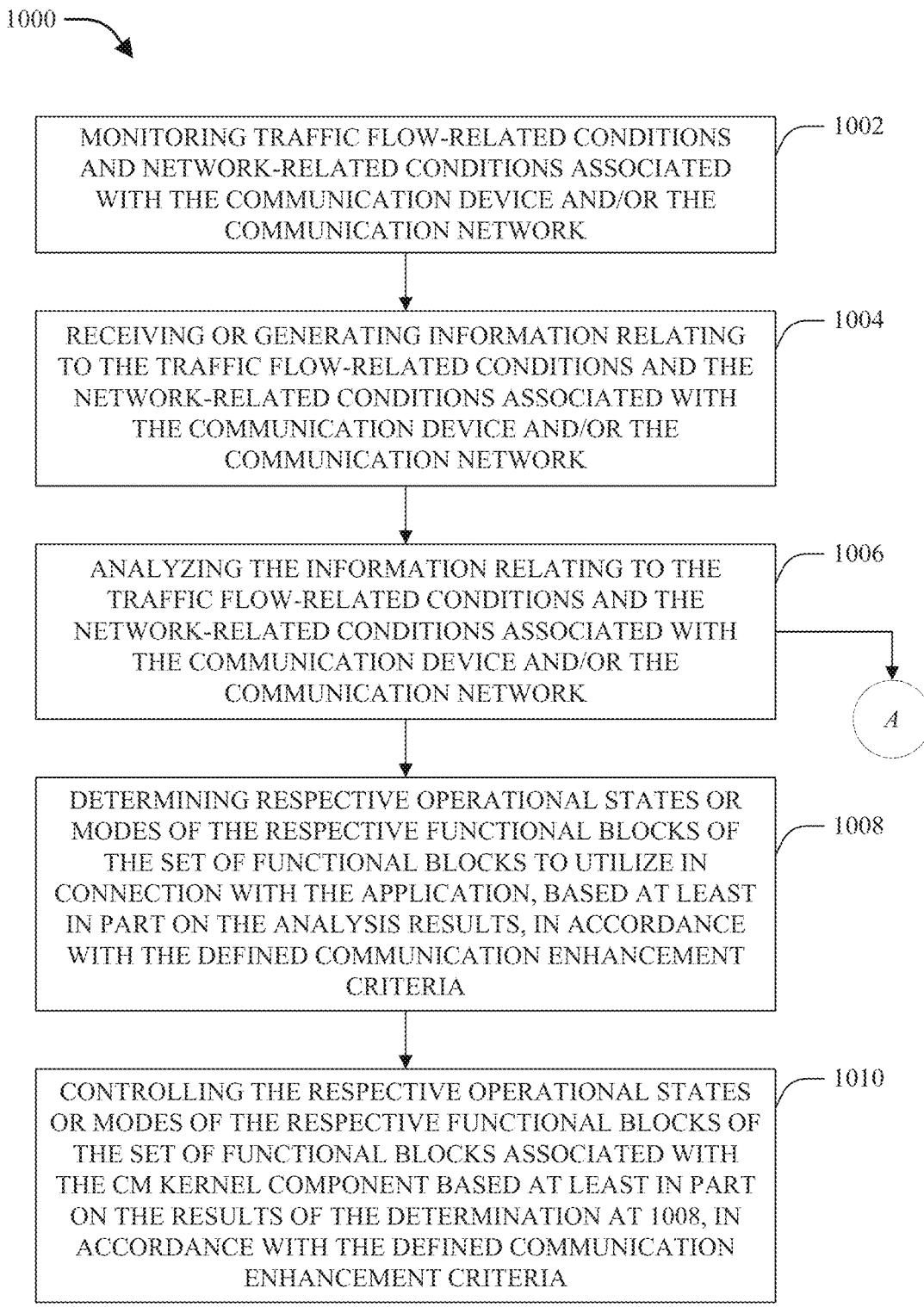
FIG. 10 presents a flow chart of an example method that can facilitate controlling functional blocks used by applications that are used by a communication device in a communication network, in accordance with various aspects and embodiments described herein.

FIG. 10 presents a flow chart of an example method 1000 that can facilitate controlling (e.g., adaptively controlling) functional blocks used by applications that are used by a communication device (e.g., UE) in a communication network, in accordance with various aspects and embodiments described herein. In accordance with various aspects, the method 1000 can be employed by, for example, a CM kernel component.

At 1002, traffic flow-related conditions and network-related conditions associated with the communication device and/or the communication network can be monitored. The CM kernel component can monitor or track the traffic-flow related conditions and the network-related conditions (e.g., network events, network state information, network-related triggers, network-related controls, etc.) associated with the communication device and/or the communication network. For instance, the CM kernel component can monitor the activity, behavior, and/or traffic flows (e.g., voice or data traffic flows) associated with the communication device and network-related conditions associated with the communication network.

At 1004, information relating to the traffic flow-related conditions and the network-related conditions associated with the communication device and/or the communication network can be received or generated. The CM kernel component can receive, collect, obtain, and/or generate information relating to the traffic-flow related conditions and the network-related conditions associated with the communication device and/or the communication network. For example, the CM kernel component can receive or obtain a first subset of information relating to the communication network and/or traffic flow that is detected by one or more sensors or APIs (e.g., API sub-components) associated with the communication device, and/or receive or obtain a second subset of information relating to the communication network and/or traffic flow from the communication network.

At 1006, the information relating to the traffic flow-related conditions and the network-related conditions associated with the communication device and/or the communication network can be analyzed. The CM kernel component can analyze the first subset and/or second subset of information, and can generate a third subset of information (e.g., analytics information) relating to the communication network and/or traffic flow based at least in part on the results of the analysis. In some implementations, some of the information received from the communication network can be analytics information generated by the communication network (e.g., generated by the network management component).

In accordance with various implementations, the CM kernel component can comprise or can be associated with the set of functional blocks (e.g., functional blocks comprising baseband functions), wherein respective functional blocks can perform respective functions (e.g., data compression or decompression, data encryption or decryption, location detection, network-awareness functions (e.g., network-condition sensing, power level sensing, etc.), etc.) The CM kernel component and the set of functional blocks can be embedded at the SOC level and within the trusted zone environment.

The CM kernel component also can analyze the information relating to the communication network and/or the traffic flow to facilitate determining which functional blocks of the set to use, and respective operational states or modes of the respective functional blocks of the set of functional blocks to implement, in connection with the application, in accordance with the defined communication enhancement criteria. As part of the analysis or evaluation, the CM kernel component can access and apply policy information (e.g., communication enhancement policy information), for example, obtained from a policy database (e.g., stored in a data store of the communication device). The policy information can be based at least in part on the defined communication enhancement criteria (e.g., which can be in accordance with desired optimization practices).

At 1008, respective operational states or modes of the respective functional blocks of the set of functional blocks to utilize in connection with the application can be determined, based at least in part on the analysis results, in accordance with the defined communication enhancement criteria. The CM kernel component can determine the respective operational states or modes of the respective functional blocks of the set of functional blocks (e.g., can determine a desired enhanced operation condition) to employ in connection with the application, based at least in part on the analysis results and policy data (e.g., from the policy database), in accordance with the defined communication enhancement criteria. For instance, the CM kernel component can determine which, if any, functional blocks of the set can be accessed and used by the application based at least in part on whether the application is determined to be a trusted application that is permitted to access one or more of the functional blocks in the set, in accordance with the defined communication enhancement criteria (e.g., a trust criterion(s) of the defined communication enhancement criteria). In some implementations, there can be one or more functional blocks in the set that can be an open or non-secure (e.g., less secure or open) functional block(s) that is permitted to be used by trusted or non-trusted applications.

If the CM kernel component determines that the application is a trusted application permitted to access at least a portion of the functional blocks or if it determines that a functional block(s) of the set is an open or non-secure (e.g., less secure or open) functional block(s) that is permitted to be used by trusted or non-trusted applications, the CM kernel component can determine an enhanced operation condition in connection with the application. For instance, the CM kernel component can determine the respective operational (e.g., switch) states or modes of the respective functional blocks of the set of functional blocks, in accordance with the defined communication enhancement criteria. The CM kernel component can determine, for example, which functional block(s) of the set to employ (e.g., which functional block(s) can be desirable (e.g., most favorable, best available, optimal, etc.) to employ), and, for a functional block(s) being employed, the desired (e.g., most favorable, best available, optimal, etc.) operational state or mode of that functional block(s). In accordance with the defined communication enhancement criteria, the functional block(s) employed also can be based at least in part on one or more preferences of the application or the communication device user.

At 1010, the respective operational states or modes of the respective functional blocks of the set of functional blocks associated with the CM kernel component (e.g., the embedded CM kernel component) can be controlled (e.g., adaptively controlled) based at least in part on the results of the determination at 1008, in accordance with the defined communication enhancement criteria. The CM kernel component can control the respective operational states or modes of the respective functional blocks based at least in part on the results of the determination at 1008, in accordance with the defined communication enhancement criteria.

In some implementations, the CM kernel component can generate control instructions or switching recommendations that can facilitate desirably switching or changing the operational states or modes of the respective functional blocks of the set of functional blocks to facilitate enhancing (e.g., optimizing, acceptably improving or augmenting, etc.) operation of the communication device and/or the communication network. The CM kernel component can communicate the control instructions or switching recommendations to the set of functional blocks, or a portion thereof, (e.g., via the kernel component or network resource manager component of the CM kernel component) to facilitate controlling the respective operational (e.g., switching) states or modes of the respective functional blocks of the set of functional blocks.

In certain implementations, the CM kernel component also can provide update information to the communication network (e.g., the base station, another component of the communication network via the base station) to facilitate notifying the communication network that the communication device is operating in accordance with the enhanced operation condition, in accordance with the defined communication enhancement criteria. The communication network can use this information to facilitate implementing a desired network operational modification, if any, based at least in part on the enhanced operation condition employed by the communication device, including the respective functional blocks of the set of functional blocks, to facilitate desired operation of the communication network, in accordance with the defined communication enhancement criteria (e.g., in accordance with desired optimization practices).

In accordance with various implementations, after the information relating to the traffic flow-related conditions and the network-related conditions associated with the communication device and/or the communication network is analyzed at reference numeral 1006, alternatively or additionally, the method 1000 can proceed to reference point A, wherein, for example, the method 1100 can proceed to provide information relating to the communication network and traffic flow to the application or user, e.g., via one or more interfaces (e.g., APIs), to facilitate enabling an application or user to select desired (e.g., favored, best available, optimal, etc.) functional blocks of the set of functional blocks to facilitate performing operations in connection with the application, in accordance with the defined communication enhancement criteria.

Figure 11:
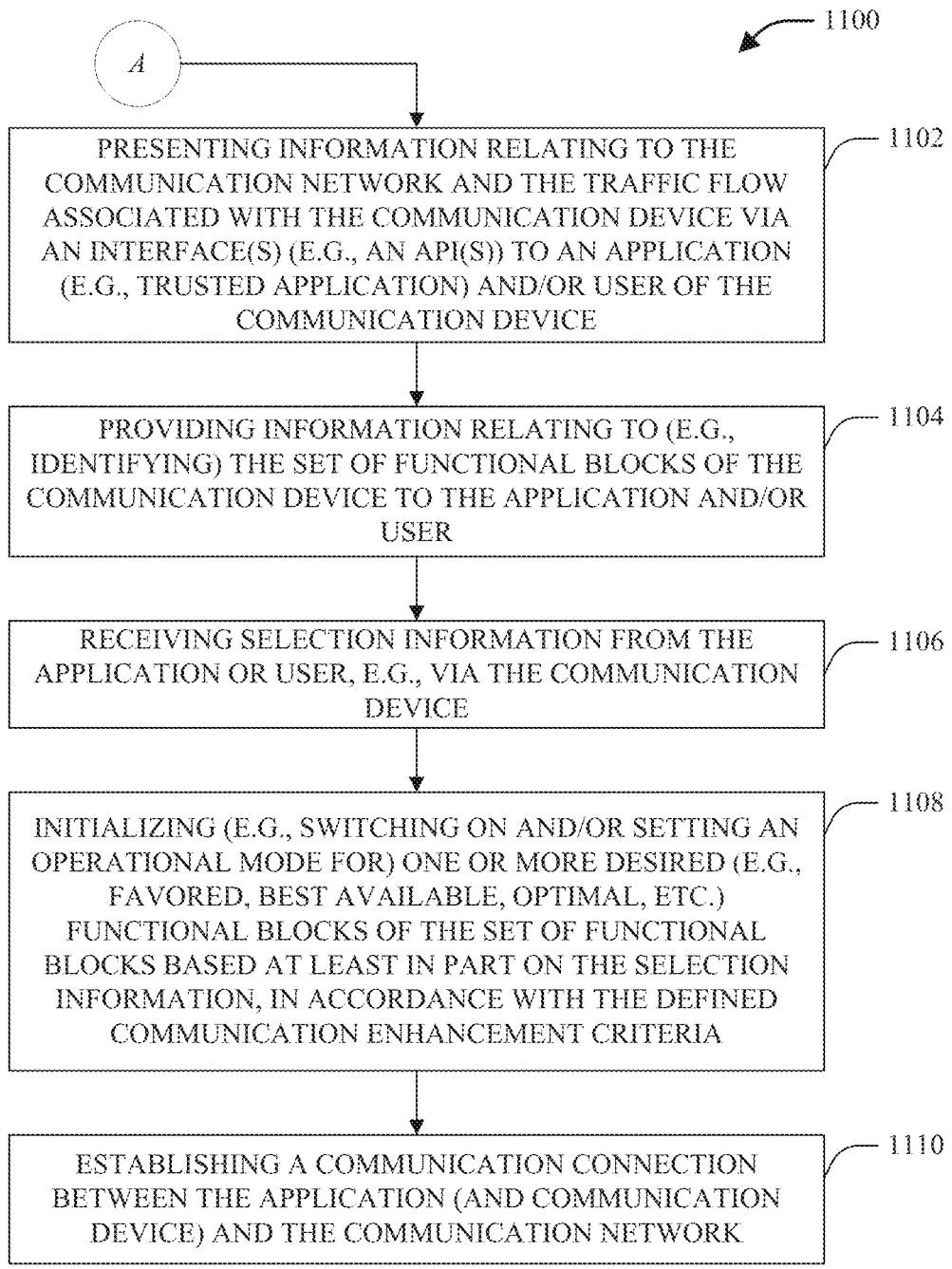
FIG. 11 depicts a flow diagram of an example method that can facilitate enabling an application or user to select desired functional blocks of the set of functional blocks of a communication device to facilitate performing operations in connection with the application, in accordance with various aspects and embodiments described herein.

Referring next to FIG. 11, depicted is a flow chart of an example method 1100 that can facilitate enabling an application or user to select desired functional blocks of the set of functional blocks of a communication device to facilitate performing operations in connection with the application, in accordance with various aspects and embodiments described herein. In accordance with various aspects, the method 1100 can be employed by, for example, the CM kernel component and/or the trusted memory component of the communication device. In some implementations, the method 1100 can proceed from reference point A of the method 1000.

At 1102, information relating to the communication network and the traffic flow associated with the communication device can be presented via an interface(s) (e.g., an API(s)) to an application (e.g., trusted application) and/or user of the communication device. The CM kernel component and/or the trusted memory component can facilitate providing (e.g., presenting, exposing, communicating, etc.) the information relating to the communication network and the traffic flow associated with the communication device to the application and/or user. The CM kernel component can do this, for example, in response to determining that the application is a trusted application, and/or the user is a trusted user, in accordance with the defined communication enhancement criteria.

The information can comprise information received or collected by the CM kernel component, analytics information and/or analysis results generated by the CM kernel component or the communication network (e.g., by the network management component), policy data, and/or other information. The information also can comprise a recommendation(s) regarding an enhanced operation condition(s) determined by the CM kernel component, in accordance with the defined communication enhanced criteria, wherein the recommendation(s) regarding the enhanced operation condition(s) can indicate which functional block(s) and/or which operational state or mode of the functional block(s) is desirable (e.g., most favorable, best available, optimal, etc.). The CM kernel component and/or the trusted memory component can provide the various portions of information to the application or user via one or more interfaces (e.g., APIs) provided by the communication device.

At 1104, information relating to (e.g., identifying) the set of functional blocks of the communication device can be provided (e.g., presented, exposed, communicated, etc.) to the application and/or user. The CM kernel component and/or the trusted memory component can provide the information relating to the set of functional blocks (e.g., embedded or secure functional blocks, and/or open functional blocks) to the application (e.g., via an interface, such as an API) to facilitate notifying the application and/or user of the availability of all or a portion of the set of functional blocks on the communication device. The information relating to the respective functional blocks also can relate to the respective functions (e.g., baseband functions) that can be performed by the respective functional blocks, as more fully disclosed herein. Depending on the trust level of the application or user, and the respective availability of the respective functional blocks of the set, all or a portion of the functional blocks of the set can be available to the application at a given time.

In some implementations, the CM kernel component, the trusted memory component, and/or all or a portion (e.g., a first subset) of the set of functional blocks can reside in the trusted zone environment of the communication device. The trusted zone environment can be a secure and trusted area of the communication device, wherein the first subset of the functional blocks, the CM kernel component, and the trusted memory component can remain invisible to, and access to the first subset of the functional blocks and the trusted memory component can be restricted to, certain applications (e.g., trusted applications) or other authorized entities (e.g., authorized users) to facilitate securing the CM kernel component, trusted memory component, and the first subset of functional blocks from being attacked, destroyed, or taken over by the unauthorized applications or other unauthorized entities. The set of functional blocks also can comprise a second subset of functional blocks that can reside in an open area of the communication device, wherein the second subset of functional blocks can be accessed by the OS kernel component, for example.

At 1106, selection information can be received from the application or user, e.g., via the communication device. The CM kernel component can receive the selection information, which can facilitate selection of a functional block(s) of the set of functional blocks, from the application or user.

For example, the application or user (e.g., using the communication device) can analyze the information relating to the communication network and traffic flow, and the information relating to the set of functional blocks (e.g., available functional blocks), and one or more desired (e.g., favored, best available, optimal, etc.) functional blocks can be selected based at least in part on such information, a preference(s) of the application or user, and the defined communication enhancement criteria. The application or other component of the communication device can communicate selection information relating to the one or more desired functional blocks that were selected to the CM kernel component.

At 1108, one or more desired (e.g., favored, best available, optimal, etc.) functional blocks of the set of functional blocks can be initialized (e.g., switched on and/or operational mode set) based at least in part on (e.g., in response to) the selection information, in accordance with the defined communication enhancement criteria. The CM kernel component can facilitate setting the operational state(s) and/or mode(s) of the desired one or more functional blocks of the set of functional blocks based at least in part on the selection information, in accordance with the defined communication enhancement criteria, wherein such selection of the desired one or more functional blocks and setting of the operational state(s) and/or mode(s) of the desired one or more functional blocks can constitute an enhanced operation condition.

At 1110, a communication connection between the application (and communication device) and the communication network can be established. The CM kernel component can facilitate establishing the communication connection between the application (and communication device) and the communication network to facilitate initiating a communication session associated with the application, wherein the application can use the one or more desired functional blocks of the set of functional blocks during the communication session. The communication connection can be a 3G, 4G, or wi-fi communication connection, for example.

In some implementations, the CM kernel component can provide update information to the communication network (e.g., the base station, another component of the communication network via the base station) to facilitate notifying the communication network that the communication device is operating in accordance with the enhanced operation condition, in accordance with the defined communication enhancement criteria. The communication network can use this information to facilitate implementing a desired network operational modification, if any, based at least in part on the enhanced operation condition employed by the communication device, including the respective functional blocks of the set of functional blocks, to facilitate desired operation of the communication network, in accordance with the defined communication enhancement criteria (e.g., in accordance with desired optimization practices).

Figure 12:
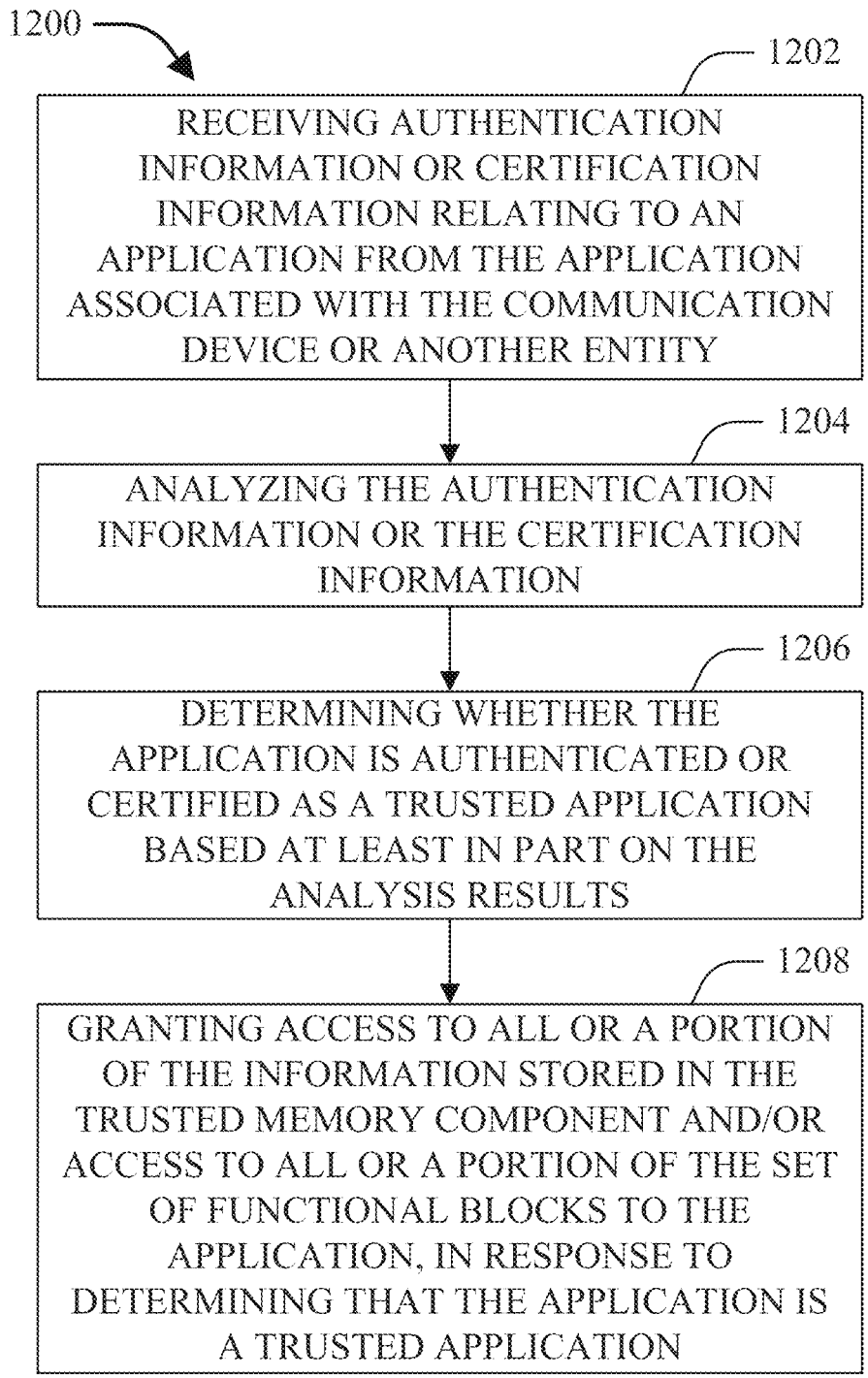
FIG. 12 illustrates a flow chart of an example method that can facilitate authenticating an application associated with a communication device to facilitate controlling access to information and resources in a trusted zone environment of the communication device, in accordance with various aspects and embodiments described herein.

Turning to FIG. 12, illustrated is a flow chart of an example method 1200 that can facilitate authenticating an application associated with a communication device to facilitate controlling access to information and resources in a trusted zone environment of the communication device, in accordance with various aspects and embodiments described herein. In accordance with various aspects, the method 1200 can be employed by, for example, the CM kernel component of the communication device.

At 1202, authentication information or certification information relating to an application can be received from the application associated with the communication device or another entity. The application can be downloaded from an application store or other source on to the communication device or can otherwise be associated with the communication device for use by the communication device or associated user. The CM kernel component can receive the authentication information or the certification information relating to the application from the application or another entity, such as the entity (e.g., application store or source) that certified the application.

In some implementations, an application can be certified through an authorized application store or other authorized entity that is authorized to certify applications as being trusted with respect to the trusted zone environment, including the CM kernel component and trusted memory component. In other implementations, an application also can be self-certifying (e.g., automatically self-certifying), for example, by being able to provide information (e.g., authentication information, certification standards information, etc.), to the CM kernel component, that can indicate (e.g., prove) that the application satisfies the requirements for being certified as a trusted or certified application.

At 1204, the authentication information or the certification information can be analyzed to generate analysis results. The CM kernel component can analyze the authentication information or the certification information submitted by the application or other entity to facilitate determining whether the application is authenticated and/or certified to be a trusted or certified application. For instance, the CM kernel component can analyze the authentication information to facilitate determining whether the authentication information is valid, for example, by matching corresponding authentication information stored in a data store associated with the CM kernel component, and/or whether the authentication information is sufficient to determine that the application is a trusted application, in accordance with the defined communication enhancement criteria (e.g., comprising defined trust criteria). The CM kernel component also can analyze the certification information to facilitate determining whether the certification information is sufficient to satisfy the defined trust criteria for determining the application to be a trusted application (e.g., determining whether the certification information is valid information and satisfies the set of certification standards relating to certification of an application as a trusted application).

At 1206, a determination can be made regarding whether the application is authenticated or certified as a trusted application based at least in part on the analysis results. The CM kernel component can determine whether the application is authenticated or certified as a trusted application based at least in part on the analysis results.

At 1208, access to all or a portion of the information stored in the trusted memory component and/or access to all or a portion of the set of functional blocks can be granted to the application, in response to determining that the application is a trusted application. The CM kernel component can grant, to the application, access to all or a portion of the information stored in the trusted memory component and/or access to all or a portion of the set of functional blocks, in response to determining that the application is a trusted application.

Figure 13:
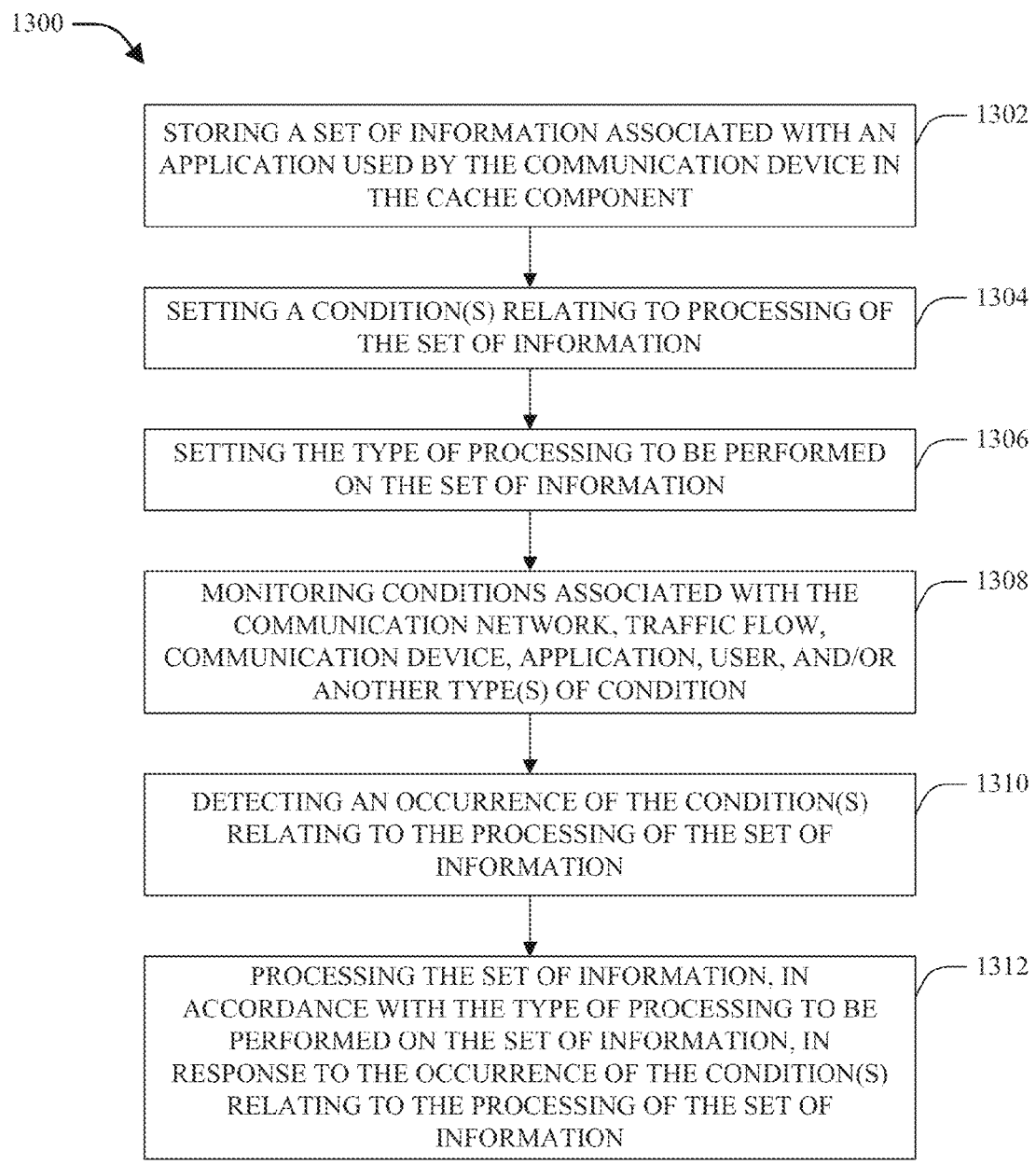
FIG. 13 presents a flow chart of an example method that can facilitate caching information in a trusted zone environment of a communication device, in accordance with various aspects and embodiments described herein.

FIG. 13 presents a flow chart of an example method 1300 that can facilitate caching information in a trusted zone environment of a communication device, in accordance with various aspects and embodiments described herein. In accordance with various aspects, the method 1300 can be employed by, for example, the CM kernel component, comprising a cache manager component, and/or a cache component of the communication device.

At 1302, a set of information associated with an application used by the communication device can be stored in the cache component. The CM kernel component (e.g., employing the cache manager component) can store the set of information associated with the application in the cache component. The set of information can comprise data relating to the application, user, communication network, or other factors or entities. The CM kernel component can receive (e.g., from the application, communication network, user, etc.) or generate information that can be included in the set of information prior to or during the execution of the method 1300.

The cache component and/or CM kernel component can be embedded at the SOC level (e.g., in a chip set) of the communication device. The cache component and/or CM kernel component also can be located within a secure trusted zone environment of the communication device to facilitate securing information, such as the set of information, and securing the operation and functionality of the components of the communication device that are within the trusted zone environment.

At 1304, a condition(s) relating to processing of the set of information can be set. The CM kernel component can specify and set the condition(s) or can receive condition setting information from the application or user that can facilitate setting or specifying the condition(s) by the CM kernel component. The condition(s) can relate to a network-related condition associated with the communication network, a traffic flow-related condition associated with the traffic flow, a communication device-related condition associated with the communication device, an application-related condition associated with the application, a user-related condition associated with the communication device user, and/or another type of condition (e.g., condition(s) relating to a date, an amount or type of data, etc.).

At 1306, the type of processing to be performed on the set of information can be set. The CM kernel component can set the type of processing to be performed on the set of information in response to an occurrence of the condition(s) relating to the processing of the set of information. The type of processing can be set based at least in part on processing-related information received from the application or user, or can be determined by the CM kernel component.

At 1308, conditions associated with the communication network, traffic flow, communication device, application, user, and/or another type(s) of condition can be monitored. The CM kernel component can monitor or track the conditions associated with the communication network, traffic flow, communication device, application, user, and/or other type(s) of condition.

At 1310, an occurrence of the condition(s) relating to the processing of the set of information can be detected. The CM kernel component can detect the occurrence of the condition(s) relating to the processing of the set of information.

At 1312, the set of information can be processed, in accordance with the type of processing to be performed on the set of information, in response to the occurrence of the condition(s) relating to the processing of the set of information. The CM kernel component can facilitate processing the set of information based at least in part on the type of processing to be performed on the set of information, in response to detecting the occurrence of the condition(s) relating to the processing of the set of information. For example, the type of processing can be to retrieve the set of information from the cache component and transmit the set of information to the application or user. As another example, the type of processing can be to retrieve the set of information from the cache component, perform one or more operations (e.g., evaluations, calculations, compression or decompression, encryption or decryption, DRM-related operations, etc.) on the set of information to generate processed information, and transmit the processed information to the application or user.

Figure 14:
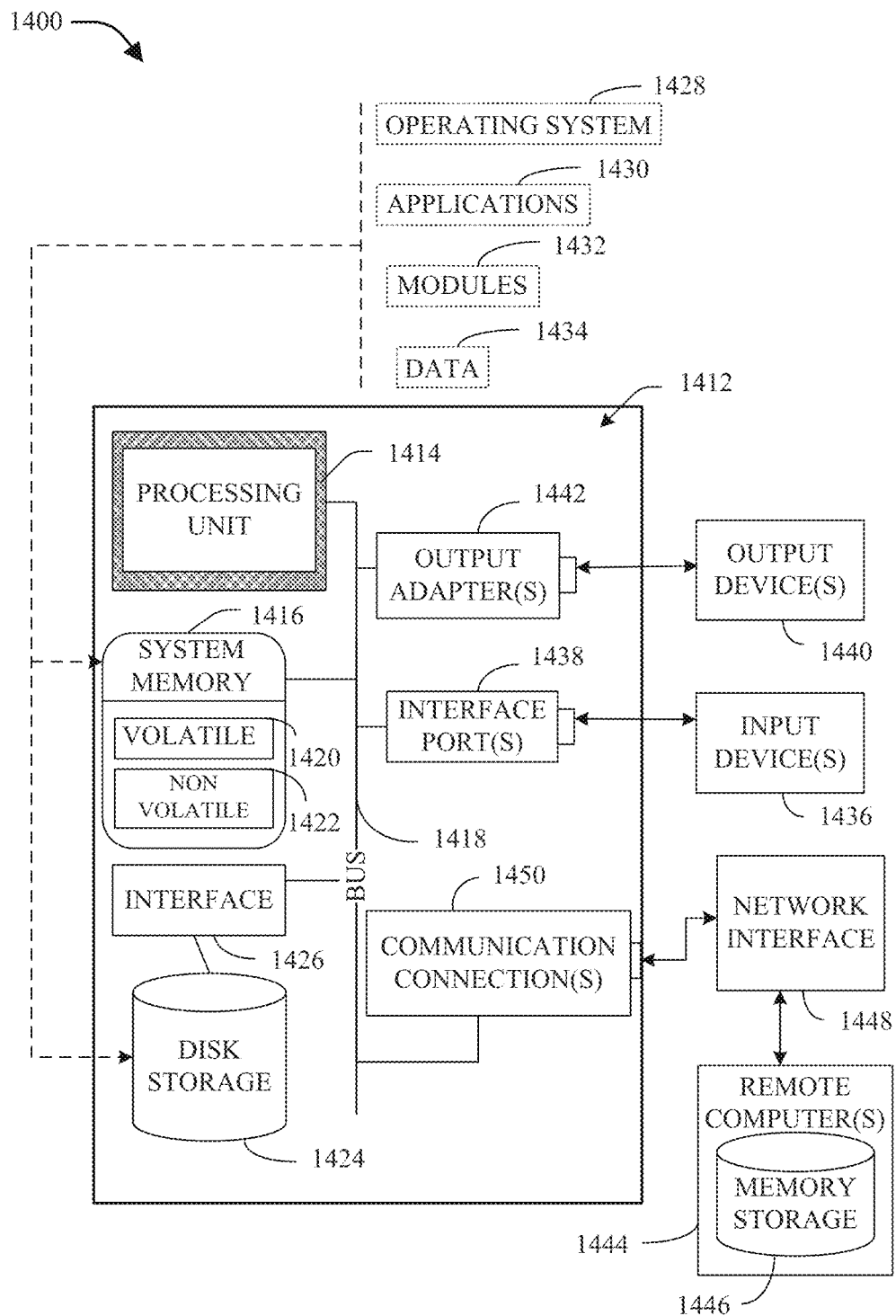
FIG. 14 is a schematic block diagram illustrating a suitable operating environment.
Figure 15:
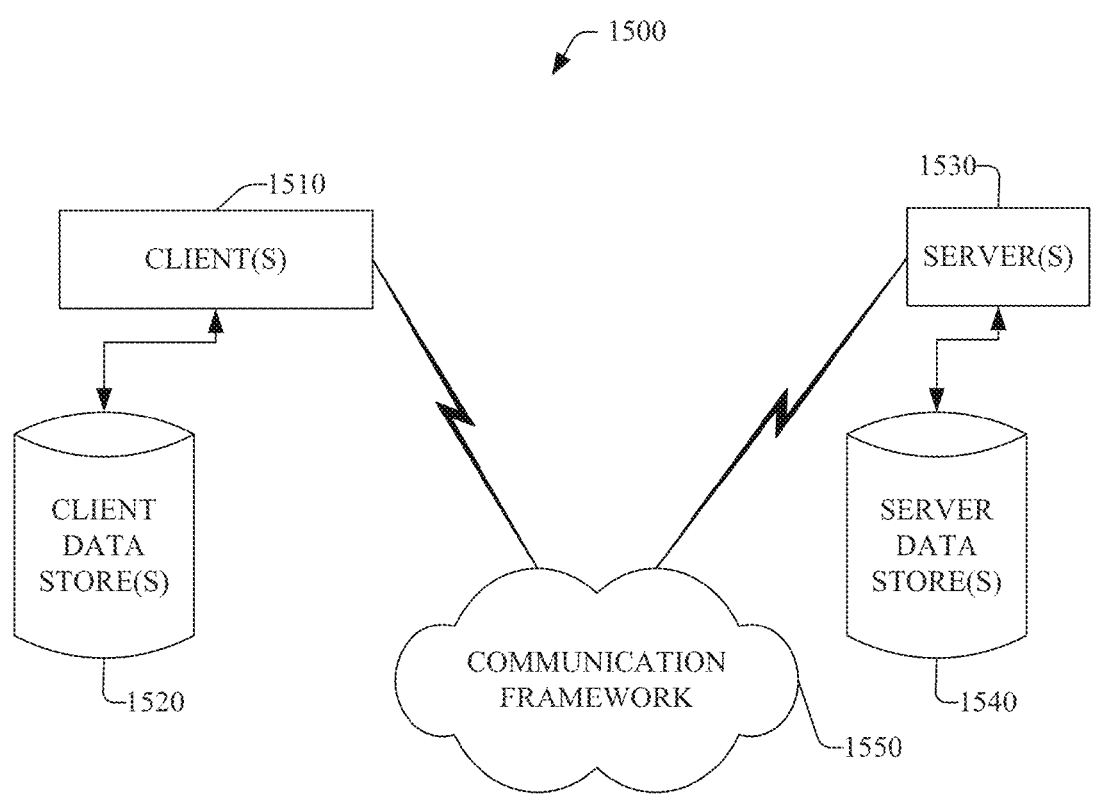
FIG. 15 is a schematic block diagram of a sample-computing environment.

In order to provide a context for the various aspects of the disclosed subject matter, FIGS. 14 and 15 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone, electronic tablets or pads, etc.), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

With reference to FIG. 14, a suitable environment 1400 for implementing various aspects of this disclosure includes a computer 1412. The computer 1412 includes a processing unit 1414, a system memory 1416, and a system bus 1418. It is to be appreciated that the computer 1412 can be used in connection with implementing one or more of the systems or components shown and described in connection with FIGS. 1-8, or otherwise described herein. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 1420 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1412 also includes removable/non-removable, volatile/non-volatile computer storage media. FIG. 14 illustrates, for example, a disk storage 1424. Disk storage 1424 includes, but is not limited to, devices like a magnetic disk drive, floppy disk drive, tape drive, Jaz drive, Zip drive, LS-100 drive, flash memory card, or memory stick. The disk storage 1424 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used, such as interface 1426.

FIG. 14 also depicts software that acts as an intermediary between users and the basic computer resources described in the suitable operating environment 1400. Such software includes, for example, an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored, e.g., in system memory 1416 or on disk storage 1424. It is to be appreciated that this disclosure can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapter 1442 is provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

FIG. 15 is a schematic block diagram of a sample-computing environment 1500 (e.g., computing system) with which the subject matter of this disclosure can interact. The system 1500 includes one or more client(s) 1510. The client(s) 1510 can be hardware and/or software (e.g., threads, processes, computing devices). The system 1500 also includes one or more server(s) 1530. Thus, system 1500 can correspond to a two-tier client server model or a multi-tier model (e.g., client, middle tier server, data server), amongst other models. The server(s) 1530 can also be hardware and/or software (e.g., threads, processes, computing devices). The servers 1530 can house threads to perform transformations by employing this disclosure, for example. One possible communication between a client 1510 and a server 1530 may be in the form of a data packet transmitted between two or more computer processes.

The system 1500 includes a communication framework 1550 that can be employed to facilitate communications between the client(s) 1510 and the server(s) 1530. The client(s) 1510 are operatively connected to one or more client data store(s) 1520 that can be employed to store information local to the client(s) 1510. Similarly, the server(s) 1530 are operatively connected to one or more server data store(s) 1540 that can be employed to store information local to the servers 1530.

It is to be noted that aspects, features, and/or advantages of the disclosed subject matter can be exploited in substantially any wireless telecommunication or radio technology, e.g., wi-fi; bluetooth; worldwide interoperability for microwave access (WiMAX); enhanced general packet radio service (enhanced GPRS); third generation partnership project (3GPP) long term evolution (LTE); third generation partnership project 2 (3GPP2) ultra mobile broadband (UMB); 3GPP universal mobile telecommunication system (UMTS); high speed packet access (HSPA); high speed downlink packet access (HSDPA); high speed uplink packet access (HSUPA); GSM (global system for mobile communications) EDGE (enhanced data rates for GSM evolution) radio access network (GERAN); UMTS terrestrial radio access network (UTRAN); LTE advanced (LTE-A); etc. Additionally, some or all of the aspects described herein can be exploited in legacy telecommunication technologies, e.g., GSM. In addition, mobile as well non-mobile networks (e.g., the internet, data service network such as internet protocol television (IPTV), etc.) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or nonvolatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field PGA (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component", "system", "platform", "framework", "layer", "interface", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "mobile station," "mobile," "wireless device," "wireless communication device," "subscriber station," "subscriber equipment," "access terminal," "terminal," "handset," and similar terminology are used herein to refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point" (AP), "base station," "node B," "evolved node B" (eNode B or eNB), "home node B" (HNB), "home access point" (HAP), and the like are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "owner," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., communication device, UE, AP, communication network, application, CM kernel component, connection manager component, kernel component, resource manager component, cache manager component, cache component, functional block, processor component, data store, etc.), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
   based on whether an application associated with a device is a trusted application, controlling, by a system comprising a processor, first access to information, relating to a communication network and a traffic flow associated with the device, that is stored in a trusted memory of the device and second access to functional blocks of the device by the application, in accordance with a defined trust criterion, wherein the functional blocks are included in a system-on-chip component to facilitate resource control and security of the functional blocks within the system-on-chip component, and wherein third access to a control layer of the system-on-chip component facilitates the controlling of the second access to the functional blocks by the application; and
   in response to determining the application is the trusted application, analyzing, by the system, the information relating to the communication network and the traffic flow associated with the device to facilitate determining a functional block of the functional blocks that is to be utilized by the application based on a result of the analyzing relating to a network condition associated with a network device of the communication network and the traffic flow associated with the device.

2. The method of claim 1, further comprising:
   storing, by the system, the information relating to the communication network and the traffic flow in the trusted memory of the device.

3. The method of claim 1, wherein the trusted memory and the functional blocks are located in a trusted zone of the device that is associated with a defined trust level that satisfies the defined trust criterion.

4. The method of claim 3, wherein the trusted zone is a first trusted zone and the defined trust level is a first defined trust level, wherein the trusted memory is a first memory, wherein the trusted memory and the functional blocks are located in the first trusted zone of the device that is associated with the first defined trust level that is a higher trust level than a second defined trust level associated with a second zone of the device that comprises a second memory, in accordance with the defined trust criterion.

5. The method of claim 1, wherein the determining the functional block of the functional blocks that is to be utilized by the application based on the result of the analyzing comprises determining the functional block of the functional blocks that is to be utilized by the application based on a first result of the analyzing relating to a level of network congestion of network devices of the communication network and a second result of the analyzing relating to an amount of the traffic flow associated with the device, and wherein the network devices comprise the network device.

6. The method of claim 1, wherein the trusted zone is a first trusted zone and the defined trust level is a first defined trust level, wherein the trusted memory is a first memory, and wherein the method further comprises:
receiving, by the system, an authentication credential in connection with the application; and
determining, by the system, whether the application is the trusted application based on the authentication credential, wherein the trusted memory and the functional blocks are in a first trusted zone of the device that is associated with a first defined trust level that is a higher trust level than a second defined trust level associated with a second zone of the device that comprises a second memory, and wherein the first defined trust level satisfies the defined trust criterion.

7. The method of claim 6, further comprising:
in response to determining the application is the trusted application, based on the authentication credential being determined to be valid, determining, by the system, access rights to be granted to the trusted application, wherein the access rights specify a level of access to the trusted memory that the trusted application is permitted to have and a subset of the functional blocks that the trusted application is permitted to access; and
granting, by the system, the access rights to the trusted application.

8. The method of claim 1, wherein the application is a first application, and wherein the method further comprises:
receiving, by the system, an authentication credential in connection with a second application;
determining, by the system, the second application is not the trusted application, in response to determining that the authentication credential is not valid; and
denying, by the system, the second application access rights to the trusted memory and the functional blocks.

9. The method of claim 1, further comprising:
sensing, by the system, a traffic load associated with the device, wherein the determining the functional block of the functional blocks that is to be utilized by the application comprises determining the functional block of the functional blocks that is to be utilized by the application based on the traffic load associated with the device.

10. The method of claim 1, wherein the device is associated with applications, comprising the application, and wherein the applications comprise at least two applications from a group of applications comprising a messaging application, a gaming application, a utility application, a financial application, a news application, a social networking application, a video application, an image capture application, a music application, an online shopping application, a location-detection application, a geographical-map-generation application, a cryptographic application, a digital-rights-management application, a mobile-to-mobile type application, a voice over Internet protocol application, and a near-real-time type application.

11. The method of claim 1, wherein the functional blocks comprise at least two functional blocks from a group of functional blocks comprising a first functional block relating to data compression, a second functional block relating to data decompression, a third functional block relating to data encryption, a fourth functional block relating to data decryption, a fifth functional block relating to location detection associated with the device, a sixth functional block relating to network-condition sensing with respect to the communication network, a seventh functional block relating to power level sensing associated with the device, an eighth functional block relating to time shifting of a traffic flow associated with the device, a ninth functional block relating to monitoring of the traffic flow, a tenth functional block relating to filtering of the traffic flow, and an eleventh functional block relating to a quality-of-experience executive routine.

12. A system, comprising:
a processor; and
a memory that stores executable instructions that, when executed by the processor, facilitate performance of operations, comprising:
based on whether an application associated with a device is a trusted application, controlling first access to data stored in a trusted memory of a device and second access to resources of the device by the application, in accordance with a defined communication enhancement criterion, wherein the data relates to a communication network and a traffic flow associated with the device, wherein the resources are located at a system-on-chip level to facilitate resource control and security of the resources at the system-on-chip level, and wherein third access to a control layer at the system-on-chip level facilitates the controlling of the second access to the resources; and
in response to determining the application is the trusted application, analyzing the data relating to the communication network and the traffic flow associated with the device to facilitate determining a resource of the resources to be utilized by the application based on a result of the analyzing relating to a network condition of a network device of the communication network and the traffic flow associated with the device.

13. The system of claim 12, wherein the determining the resource of the resources to be utilized by the application based on the result of the analyzing comprises determining the resource of the resources to be utilized by the application based on a first result of the analyzing relating to network congestion of network devices of the communication network and a second result of the analyzing relating to a level of the traffic flow associated with the device, and wherein the network devices comprise the network device.

14. The system of claim 12, wherein the operations further comprise:
receiving an authentication credential associated with a user identity; and
determining whether the authentication credential is valid.

15. The system of claim 14, wherein the operations further comprise:
in response to determining the authentication credential is valid, determining access rights to be granted to the user identity, wherein the access rights specify a level of access to the trusted memory that the user identity is permitted to have and a subset of the resources that the user identity is permitted to access.

16. The system of claim 14, wherein the operations further comprise:
in response to determining the authentication credential is not valid, denying the user identity access rights to the trusted memory and the resources.

17. The system of claim 12, wherein the operations further comprise:
sensing the network condition associated with the network device that is associated with the communication network to facilitate the determining the resource of the resources that is to be utilized by the application.

18. The system of claim 12, wherein the operations further comprise:
in response to the determining that the application is the trusted application, exposing, via a first interface, the data to the application to facilitate analysis of the data by the application, and
exposing, via a second interface, resource information relating to the resources to the application to facilitate analysis of the resource information by the application.

19. A machine-readable storage device, comprising executable instructions that, when executed by a processor, facilitate performance of operations, comprising:
controlling first access to data, relating to a communication network and a traffic flow associated with a device, that is stored in a trusted memory of the device and second access to resources of the device by an application associated with the device, based on whether the application is a trusted application and in accordance with a defined trust criterion, wherein the resources are included in a system-on-chip component to facilitate security of the resources within the system-on-chip component, and wherein third access to a control layer of the system-on-chip component facilitates the controlling of the second access to the resources; and
in response to determining the application is the trusted application, analyzing the data relating to the communication network and the traffic flow associated with the device to facilitate determining a resource of the resources that is to be utilized by the application based on a result of the analyzing that relates to a level of congestion of network devices associated with the communication network and the traffic flow associated with the device.

20. The machine-readable storage device of claim 19, wherein the operations further comprise:
monitoring a first condition relating to the communication network and a second condition relating to the traffic flow associated with the device; and
receiving the data in response to the monitoring, wherein the data pertains to the first condition relating to the communication network and the second condition relating to the traffic flow to facilitate the analyzing of the data.

* * * * *